United States Patent
Yamada et al.

(10) Patent No.: US 6,963,793 B2
(45) Date of Patent: Nov. 8, 2005

(54) DISTRIBUTION NETWORK MONITORING AND CONTROL SYSTEM

(75) Inventors: Masahiro Yamada, Tokyo (JP); Susumu Katsumata, Tokyo (JP); Yoshihiro Ogita, Tokyo (JP)

(73) Assignee: TMT&D Corporation, Tokyo (JP)

( * ) Notice: Subject to any disclaimer, the term of this patent is extended or adjusted under 35 U.S.C. 154(b) by 0 days.

(21) Appl. No.: 10/796,106

(22) Filed: Mar. 10, 2004

(65) Prior Publication Data
US 2004/0233598 A1 Nov. 25, 2004

(30) Foreign Application Priority Data
Mar. 14, 2003 (JP) .................................... P1003-069321

(51) Int. Cl.[7] ...................... G05D 11/00; G05D 17/00; G05D 3/12; G05D 5/00; G05D 9/00
(52) U.S. Cl. .................................. 700/293; 700/286
(58) Field of Search ............................... 700/286, 293; 324/76.11

(56) References Cited

U.S. PATENT DOCUMENTS

| | | | | |
|---|---|---|---|---|
| 5,579,195 A | * | 11/1996 | Nishijima et al. | 361/62 |
| 5,839,093 A | * | 11/1998 | Novosel et al. | 702/59 |
| 5,973,699 A | | 10/1999 | Kent | |
| 5,973,899 A | * | 10/1999 | Williams et al. | 361/72 |
| 6,002,260 A | * | 12/1999 | Lau et al. | 324/522 |
| 6,055,145 A | * | 4/2000 | Lagree et al. | 361/93.1 |
| 6,243,244 B1 | * | 6/2001 | Nelson et al. | 361/64 |
| 6,347,027 B1 | * | 2/2002 | Nelson et al. | 361/64 |
| 6,539,287 B1 | * | 3/2003 | Ashizawa | 700/292 |
| 6,697,240 B2 | * | 2/2004 | Nelson et al. | 361/64 |
| 6,816,757 B1 | * | 11/2004 | De La Ree et al. | 700/286 |
| 6,850,395 B2 | * | 2/2005 | Claus et al. | 361/71 |
| 2003/0229423 A1 | * | 12/2003 | Andarawis et al. | 700/286 |
| 2004/0153215 A1 | * | 8/2004 | Kearney et al. | 700/293 |

FOREIGN PATENT DOCUMENTS

JP    63-109694    5/1988

* cited by examiner

Primary Examiner—Leo Picard
Assistant Examiner—Ryan A. Jarrett
(74) Attorney, Agent, or Firm—Oblon, Spivak, McClelland, Maier & Neustadt, P.C.

(57) ABSTRACT

A distribution network monitoring and control system for monitoring and controlling a distribution network system including monitoring and control means for taking in an information and for outputting a control information for the switches thereof, status grasping means for judging charging and outage state of the distribution network system, switch status take-in means for taking in status of the switches in a range to which power was transmitted when the fault was generated, fault section judging means for judging a fault section according to a fault information, and fault section expanding means for expanding a fault section to a load side when status of the switches at the load side of the fault section cannot be taken out and for notifying an expanded fault section to the fault section judging means. The fault section judging means decides the expanded fault section as the fault section. The distribution network monitoring and control system further includes, fault processing means for isolating the fault section from the distribution network system and for executing recovering operation to an outage section, and recovering procedure preparation means for preparing a recovering operation procedure to the outage section.

11 Claims, 30 Drawing Sheets

DISTRIBUTION NETWORK MONITORING AND CONTROL SYSTEM

CROSS-REFERENCE TO RELATED APPLICATIONS

This application is based upon and claims the benefit of priority from the prior Japanese Patent Application No. 2003-69321, filed on Mar. 14, 2003; the entire contents of which are incorporated herein by reference.

BACKGROUND OF THE INVENTION

1. Field of the Invention

This invention relates to a distribution network monitoring and control system for monitoring and controlling the system status of a distribution network system.

2. Description of the Background

A Distribution Management System (DMS) and distribution network equipments for judging a fault generated in a distribution network system are classified into a Current Sensing System (CSS) and a Voltage Sensing System (VSS).

CSS is a system which is used widely in Europe and America. CSS judges a fault section based on the action of an Over Current Relay (OCR) provided in each switch. A switch for CSS is called a CSW. Hereafter, this switch is referred to as a CSW. A CSW is composed of a switch (SW), a terminal unit (FTU) with communication function and OCR function and a battery.

CSS judges a fault section based on the action state of OCR provided in the switch, and executes an isolation of the fault section and recovering operation to the non-faulted section.

VSS is a system which is used widely in Japan. VSS judges a fault section by a Fault Detecting Relay (FDR) provided in each switch. A switch for VSS is called a VSW. Hereafter, this switch is referred to as a VSW. A VSW is composed of a switch (SW) and a terminal unit (FTU) with communication function and FDR function. A FDR is provided with a function to open a switch automatically when no voltage state is detected, a function to close the switch when voltage is applied, and a function to make locked state when no voltage state is detected within a predetermined time after closing the switch and to keep the opened state even if voltage is applied again. VSS executes isolation of the fault section and recovering operation to the section of power source side from the fault section by a trip, a reclosing, a re-trip and a re-reclosing of a feeder circuit breaker (FCB) and the function of FDR. Then DMS executes a recovering operation to the section of the load side from the fault section.

FIG. 34 shows one example of the construction of a distribution network monitoring and control system having a fault section judging means to judge a fault section when a fault is generated in a distribution line in a CSS type distribution network system which is monitored and controlled using CSWs.

As shown in FIG. 34, a distribution network monitoring and control system 1A is composed of: a monitoring and control means 11 to take in the information of distribution network equipments such as CSWs (hereafter, simply referred to as switches) of a CSS type distribution network system 2 and to output control information for the switches thereof; a status grasping means 12 to judge charging and outage state of CSS type distribution network system 2 according to the information on distribution network equipments taken by monitoring and control means 11; a switch status take-in means 13 to take in the status of the switches in a range to which power was so far transmitted through a feeder causing a fault, as required when the status grasping means 12 judged that a fault was generated; a CSS type fault section judging means 14A to judge a fault section according to the fault information of the switches taken in by switch status take-in means 13; a fault processing means 15 to isolate the fault section detected by CSS type fault section judging means 14A from CSS type distribution network system 2 and to transmit power to an outage section other than the fault section (hereafter, referred to as a recovering operation); and a CSS type recovering procedure preparation means 16A to prepare a recovering operation procedure to the outage section other than the fault section on the assumption that the switches are to be controlled.

Further, switches are provided with batteries and so constructed that they are controllable even in the outage section.

Monitoring and control means 11 receives a distribution network equipment information from CSS type distribution network system 2, and when it is found that the equipment status is changed (hereafter, called as the status change) based on a difference from the information received last time, monitoring and control means 11 notifies status grasping means 12 of the status change content.

Further, monitoring and control means 11 outputs control signals to distribution network equipments composing CSS type distribution network system 2 upon request for control.

Status grasping means 12 judges charging/outage state and fault generation of CSS type distribution network system 2 according to the distribution network equipment information notified from monitoring and control means 11. When it is judged that the fault is generated, status grasping means 12 notifies the generation of the fault to switch status take-in means 13, and after a certain time passed from the generation of the fault, status grasping means 12 requests CSS type fault section judging means 14A to judge the fault section.

Switch status take-in means 13 searches switches in a range to which power was so far transmitted before a fault through the feeder that caused a fault according to the notification from status grasping means 12, requests monitoring and control means 11 to take in the status of the searched switches, and receives the result of the taken-in status through status grasping means 12.

CSS type fault section judging means 14A judges a fault section according to the switch fault information received from status grasping means 12 in response to a fault section judging request from status grasping means 12, and notifies fault processing means 15 of the result.

Fault processing means 15 sends a request for control to isolate the fault section and a request for control to provide a recovering operation to non-faulted outage section to monitoring and control means 11, and receives the controlled result through status grasping means 12.

CSS type recovering procedure preparation means 16A prepares a recovering procedure to non-faulted outage section in response to a request from fault processing means 15, and notifies the result to fault processing means 15.

FIG. 35 is an explanatory diagram for explaining the fault section judging process executed in conventional distribution network monitoring and control system 1A.

In FIG. 35, FIG. 35(a) shows a timing chart of the fault section judging process and FIG. 35(b) shows the construction of a part of CSS type distribution network system 2. In FIG. 35(b), a feeder circuit breaker FCB, switches SW1–SW9 and a tie switch TSW are provided in CSS type distribution network system 2. Furthermore, for each switch, the type of the switch (remote controlled switch or remote controlled switch (tie switch)) is shown with different symbol. Here, it is assumed that a fault is generated in a section between switches SW5 and SW6.

In FIG. 34 and FIG. 35, distribution network monitoring and control system 1A detects an initial breaking of feeder circuit breaker FCB by status grasping means 12, and judges the generation of distribution line fault (FIG. 35(a) at a time ②). When a distribution line fault is generated, relays of switches SW1–SW4 at the power source side from a fault section act, and distribution network monitoring and control system 1A grasps the fault information of switches SW1–SW4 (the relay action state) by the status change notice from switches SW1–SW4 (FIG. 35(a) at times ①, ③, ⑤ and ⑦).

The relay actions of switches SW1–SW4 may be distinguished for fault factors, such as short circuit, ground circuit, etc. In this case, distribution network monitoring and control system 1A is notified of the information on the relay actions for each factor. Thereafter, the circuit is reclosed by the function of feeder circuit breaker FCB (FIG. 35(a) at a time ④). When a fault continues, feeder circuit breaker FCB is tripped again (FIG. 35(a) at a time ⑥).

After passing a determined time from the generation of fault (hereafter, called as a time Tdet) (FIG. 35(a) at a time ⑧)), distribution network monitoring and control system 1A executes a forced polling by switch status take-in means 13, receives a fault information of switch SW5 in addition to the fault information of switches SW1–SW4, previously received by the status change notice, takes the status of all the switches in a range to which power was transmitted before the fault through the feeder causing the fault, and grasps the fault information of all the switches that are needed to judge a fault section.

CSS type fault section judging means 14A judges a section between switches SW5–SW6 as a fault section that is a load side section of switch SW5 (hereafter, referred to a fault factor switch) located most close to the load side among the switches which notified the fault information (FIG. 35(a) at a time ⑨).

Distribution network monitoring and control system 1A isolates a fault section by opening switches SW5–SW6 adjacent to the fault section, and then, by closing a feeder circuit breaker FCB, recovers an outage section at the power source side from the fault section (hereafter, referred to as a power source side non-faulted section) by fault processing means 15. An outage section at a load side from the fault section (hereafter, referred to as a load side non-faulted section) is recovered by preparing a recovering procedure in consideration of the distribution line allowable current of the recovered distribution line by CSS type recovering procedures preparation means 16A.

FIG. 36 shows one example of the construction of a distribution network monitoring and control system 1V having a fault section judging means to judge a fault section when a fault is generated in a distribution line in a VSS type distribution network system 3 which is monitored and controlled using VSWs.

In FIG. 36, the same component elements as those shown in FIG. 34 are assigned with the same reference numerals and a detailed explanation thereof will be omitted.

As shown in FIG. 36, distribution network monitoring and control system 1V is composed of: monitoring and control means 11; status grasping means 12; switch status take-in means 13; a VSS type fault section judging means 14V that searches a switch that is locked for making for no-voltage during the detection time period from the information of taken-in VSWs (hereafter, called simply as switches) and judges the load side of the searched switch as a fault section; fault processing means 15; and a VSS type recovering procedure preparation means 16V to prepare recovering operation procedure to the outage section other than the fault section on the assumption that the switches are to be controlled.

Further, as the switches in the outage section cannot be controlled, it is necessary to control the switches in order from the power source side.

VSS type fault section judging means 14V searches switches in the input lock state from the taken-in information of the switches, judges the load side of the searched switch as a fault section in response to a fault section judging request from status grasping means 12, and notifies fault processing means 15 of the fault section judging result.

VSS type recovering procedure preparation means 16V prepares a recovering procedure to non-faulted outage section in response to a request from fault processing means 15, and notifies the result to fault processing means 15.

In the fault section judging process by the above-mentioned conventional distribution network monitoring and control system 1A, out of CSWs of which the fault information is notified, a load side section of switch SW5 located most close to the load side is judged to be a fault section. However, when the status of a load side switch of the judged fault section could not be taken, that switch might possibly detect fault information, and in the case that the fault information was detected, a fault section may be erroneously judged.

When a self-line loop route, which is a state in which the number of feeders that supply power to a loop circuit is one, is adjacent to the load side of a judged fault section or when a judged fault section is in a self-line loop route, which side becomes a load side section cannot be determined unless the flowing direction of power in the self-line loop route is known. Therefore, a fault section may possibly be judged erroneously.

When a distribution network system before a fault is an other line loop route, which is a state in which the number of feeders which supply power to a loop circuit is two or more, fault information is detected through switches on routes to all feeder circuit breakers FCB from a fault section. In the fault section judging process by the conventional technology, a fault is judged by a feeder circuit breaker FCB that is lastly tripped out of feeder circuit breakers FCB in the other line loop. Then, a load side section of the switch which is most close to the load side from that feeder circuit breaker FCB out of switches of which faults were notified is judged as a fault section, and thus, a fault section may be erroneously judged.

When a plurality of fault factors are generated simultaneously and a plurality of fault factors are on the same route from a tripped feeder circuit breaker FCB, only a load side section of a switch which is most close to the load side is judged to be a fault section, regardless a fault factor, out of switches of which faults are notified according to the fault section judgment of the conventional technology. Accordingly, as the other fault factors are not judged, a fault section may be erroneously judged.

When factors for an intermittent fault, which is a fault that is generated and recovered repeatedly within a short time period, exist in a plurality of sections, only a load side section of a switch which is most close to the load side is judged to be a fault section out of switches of which faults are notified according to the fault section judgment of the conventional technology. Accordingly, as fault factors during the intermediate time cannot be judged, a fault section may be erroneously judged.

When a fault section was erroneously judged as described above, feeder circuit breaker FCB might be tripped in the recovering operation to a non-faulted section at a power source side or in the recovering operation to a non-faulted section at a load side, causing the extension of an outage time and the expansion of an outage section.

Further, in a mixed type distribution network system wherein CSWs and VSWs are provided in mix, there are problems described below.

That is, when there is provided only one function of either a VSS type fault processing system or a CSS type fault processing system, a fault section may not be detected depending on a system status when a fault is generated.

Also, when only an recovering procedure preparation system that is the same system as that of a fault section judging system is selectable, a recovering procedure may not be prepared.

In addition, when a fault is judged as an intermittent fault, a fault section cannot be judged by a VSS type fault processing system but the whole sections are judged as fault sections. Thus, the fault section judgment may not be made in a pre-selected fault processing system.

Further, according to the fault section judging result by either a VSS type fault processing system or a CSS type fault processing system, fault sections may not be limited sufficiently.

Furthermore, in the case of a VSS type fault processing system, reclosing is indispensable. Accordingly, even in the case that a fault section can be judged according to a CSS type fault processing system, because feeder circuit breaker FCB is reclosed for a VSS type fault processing system, feeder circuit breaker FCB is tripped again, and an outage time of non-faulted section at the power source side becomes long.

SUMMARY OF THE INVENTION

It is an object of this invention to provide a distribution network monitoring and control system which can adequately and accurately judge a fault section even when the status of switches at a load side of a judged fault section is not taken in.

According to an aspect of this invention, there is provided a distribution network monitoring and control system for monitoring and controlling a CSS type distribution network system provided with CSWs, including, monitoring and control means for taking in an information of the CSWs of the CSS type distribution network system and for outputting a control information for the CSWs thereof, status grasping means for judging charging and outage state of the CSS type distribution network system according to the information on the CSWs taken by the monitoring and control means, switch status take-in means for taking in status of the CSWs in a range to which power was so far transmitted through a feeder causing a fault, when the status grasping means judged that the fault was generated, CSS type fault section judging means for judging a fault section according to a fault information of the CSWs taken in by the switch status take-in means, and fault section expanding means for receiving an information of the fault section from the CSS type fault section judging means, for expanding a fault section to a load side, when status of the CSWs at the load side of the fault section cannot be taken in, and for notifying an expanded fault section to the CSS type fault section judging means.

The CSS type fault section judging means decides the expanded fault section notified from the fault section expanding means as the fault section. The distribution network monitoring and control system further includes, fault processing means for isolating the fault section decided by the CSS type fault section judging means from the CSS type distribution network system and for executing recovering operation to an outage section other than the fault section, and CSS type recovering procedure preparation means for preparing a recovering operation procedure to the outage section other than the fault section on a assumption that the CSWs are to be controlled.

According to another aspect of this invention, there is provided a distribution network monitoring and control system for monitoring and controlling a mixed type distribution network system provided with VSWs and CSWs in mix including, monitoring and control means for taking in an information of the VSWs and the CSWs of the mixed type distribution network system and for outputting a control information for the VSWs and the CSWs thereof, status grasping means for judging charging and outage state of the mixed type distribution network system according to the information on the VSWs and the CSWs taken by the monitoring and control means, and switch status take-in means for taking in status of the VSWs and the CSWs in a range to which power was so far transmitted through a feeder causing a fault, when the status grasping means judged that the fault was generated.

The distribution network monitoring and control system further includes, fault processing system selecting means for selecting either a VSS type fault processing system or a CSS type fault processing system when a fault section judging request is received from the status grasping means, VSS type fault section judging means for judging a fault section according to a fault information of the VSWs taken in by the switch status take-in means when the VSS type fault processing system is selected by the fault processing system selecting means, CSS type fault section judging means for judging a fault section according to a fault information of the CSWs taken in by the switch status take-in means when the CSS type fault processing system is selected by the fault processing system selecting means, fault processing means for isolating the fault section decided by a selected one of the VSS type fault section judging means and the CSS type fault section judging means from the mixed type distribution network system and for executing recovering operation to an outage section other than the fault section, VSS type recovering procedure preparation means for preparing a recovering operation procedure to the outage section other than the fault section on a assumption that the VSWs are to be controlled when the VSS type fault processing system is selected and CSS type recovering procedure preparation means for preparing a recovering operation procedure to the outage section other than the fault section on a assumption that the CSWs are to be controlled when the CSS type fault processing system is selected.

According to still another aspect of this invention, there is provided a distribution network monitoring and control system for monitoring and controlling a mixed type distribution network system provided with VSWs and CSWs in mix including, monitoring and control means for taking in an information of the VSWs and the CSWs of the mixed type distribution network system and for outputting a control information for the VSWs and the CSWs thereof, status grasping means for judging charging and outage state of the mixed type distribution network system according to the information on the VSWs and the CSWs taken by the monitoring and control means, switch status take-in means for taking in status of the VSWs and the CSWs in a range to which power was so far transmitted through a feeder causing a fault, when the status grasping means judged that the fault was generated, VSS type fault section judging means for judging a fault section according to a fault information of the VSWs taken in by the switch status take-in means, CSS type fault section judging means for judging a fault section according to a fault information of the CSWs taken in by the switch status take-in means.

The distribution network monitoring and control system further includes, fault section comparing and judging means for judging a fault section by comparing results executed simultaneously by the VSS type fault section judging means and the CSS type fault section judging means, fault processing means for isolating the fault section decided by the mixed type distribution network system fault section comparing and judging means from the mixed type distribution network system and for executing recovering operation to an outage section other than the fault section, VSS type recovering procedure preparation means for preparing a recovering operation procedure to the outage section other than the fault section on a assumption that the VSWs are to be controlled and CSS type recovering procedure preparation means for preparing a recovering operation procedure to the outage section other than the proper fault section on a assumption that the CSWs are to be controlled.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

Figure 1:
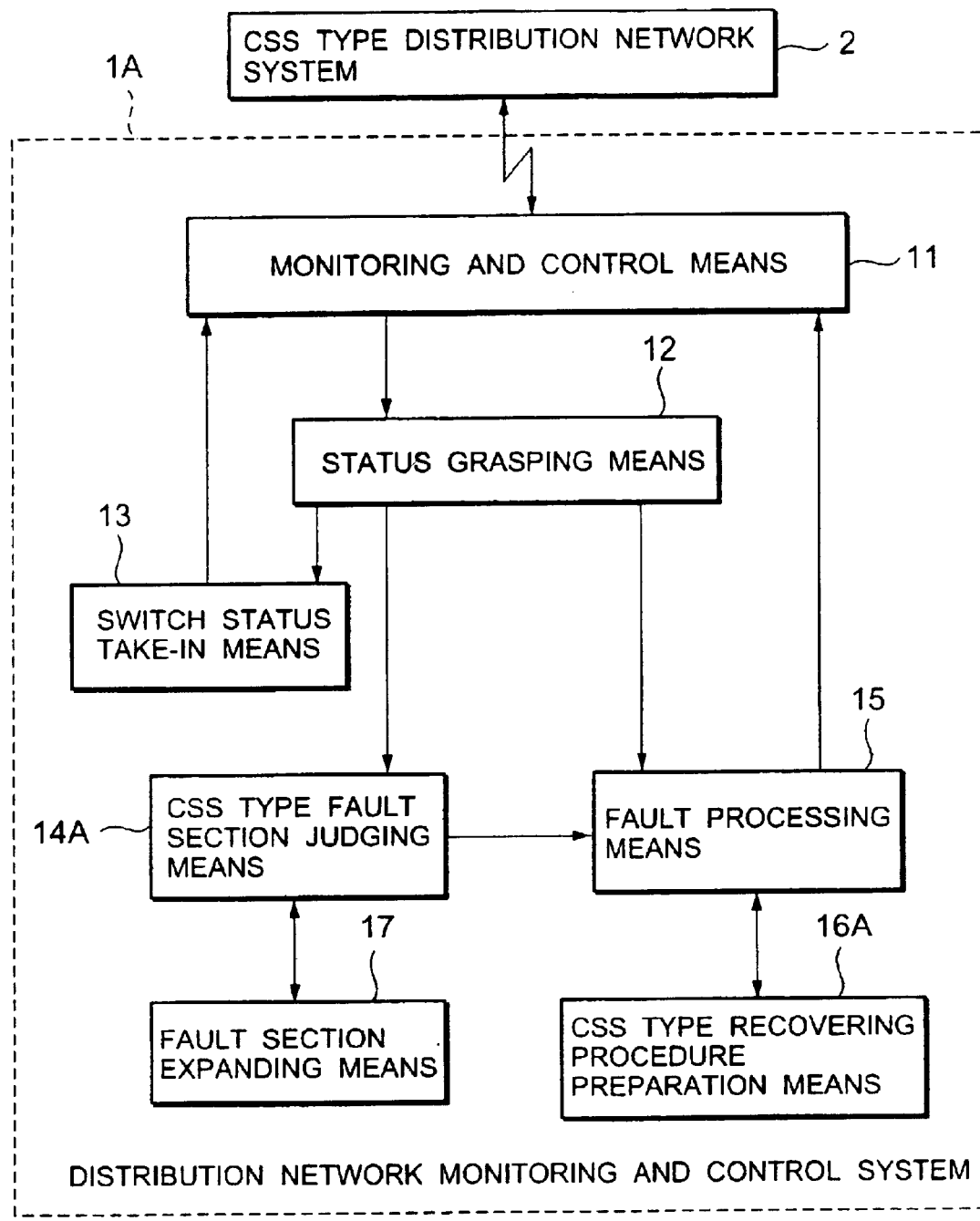
FIG. 1 is a block diagram showing the construction of a distribution network monitoring and control system according to a first embodiment of this invention.

Referring now to the drawings, wherein like reference numerals designate identical or corresponding parts throughout the several views, the detailed explanation thereof will be omitted. The embodiments of this invention will be described below.

First Embodiment

FIG. 1 is a diagram showing a first embodiment of this invention. In the embodiment shown in FIG. 1, a fault section expanding means 17 is added to conventional distribution network monitoring and control system 1A shown in FIG. 34 which monitors and controls CSS type distribution network system 2. Fault section expanding means 17 is to expand a fault section when fault information is not taken from the switches.

Fault section expanding means 17 receives information on a fault section from CSS type fault section judging means 14A after CSS type fault section judging means 14A executes the fault section judging process. When the status of the switches at the load side adjacent to the fault section cannot be taken in, fault section expanding means 17 further expands a fault section to a load side, and notifies the expanded fault section to CSS type fault section judging means 14A.

Figure 2:
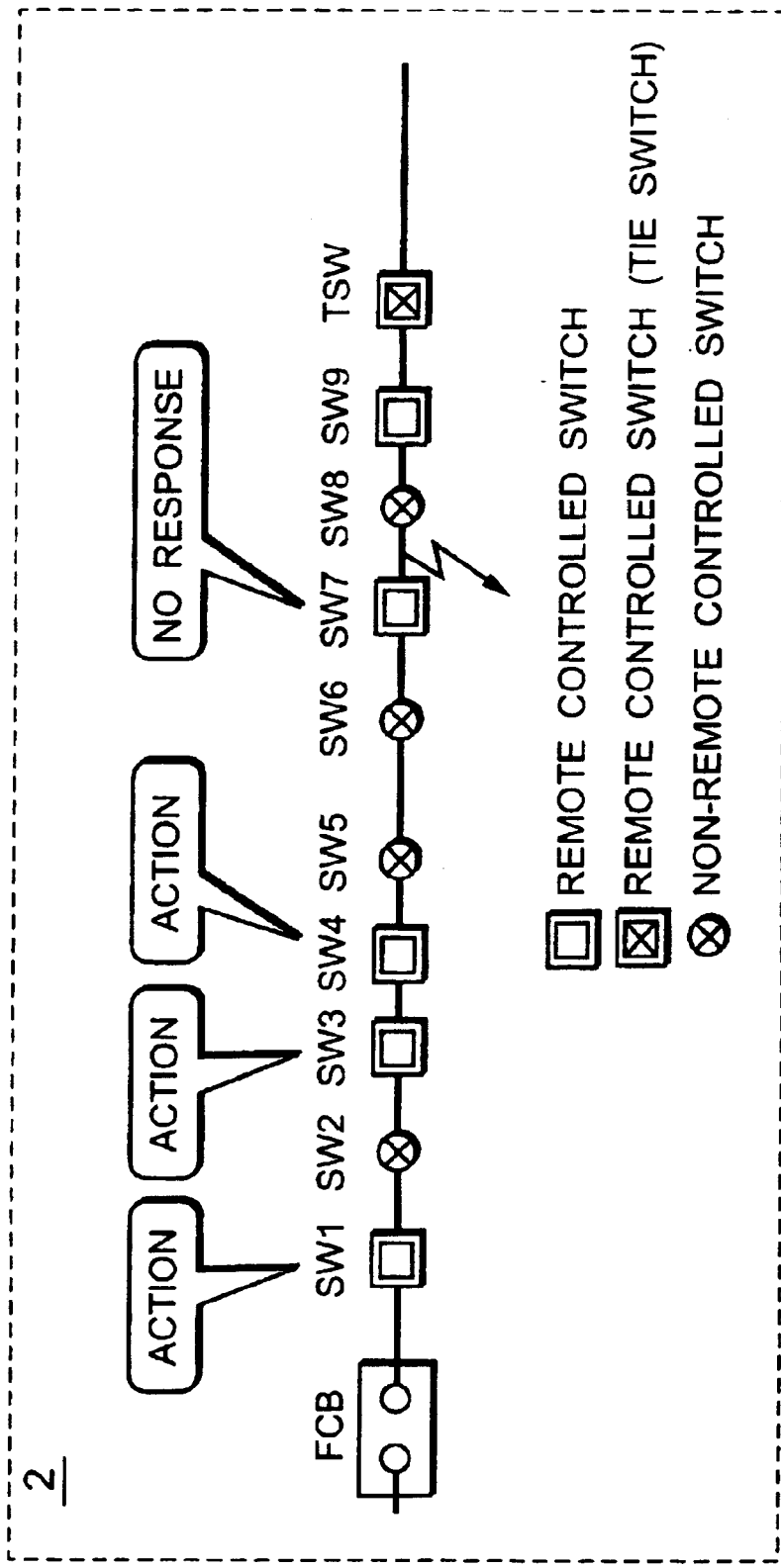
FIG. 2 is an explanatory diagram for explaining an action of the distribution network monitoring and control system according to the first embodiment of this invention.

FIG. 2 is an explanatory diagram for explaining the fault section judging process executed in distribution network monitoring and control system 1A in the first embodiment.

FIG. 2 shows the construction of a part of CSS type distribution network system 2. In FIG. 2, a feeder circuit breaker FCB, switches SW1–SW9 and a tie switch TSW are provided in CSS type distribution network system 2. Furthermore, for each switch, the type of the switch (remote controlled switch, remote controlled switch (tie switch), or non-remote controlled switch) is shown with different symbol. Here, it is assumed that a fault is generated in a section between switches SW7 and SW8.

Distribution network monitoring and control system 1A detects an initial breaking of feeder circuit breaker FCB by status grasping means 12. When a distribution line fault is generated, the relay action information is notified from switches SW1, SW3 and SW4 of CSS type distribution network system 2. The circuit is reclosed by the function of feeder circuit breaker FCB, and when a fault continues, feeder circuit breaker FCB is tripped again.

Distribution network monitoring and control system 1A takes in the status of the switches in a range to which power was transmitted before the fault from the feeder causing the fault, based on the request of switch status take-in means 13 after passing determined time Tdet from the generation of the fault.

CSS type fault section judging means 14A judges a section between switches SW4–SW7 that is a load side section of fault factor switch SW4 out of those switches of which fault information is notified as a fault section. However, when an actual fault section is a section between switches SW7–SW9 and the relay action of switch SW7 at the load side of the judged fault section cannot be taken for transmission error, generation of no response, etc., CSS type fault section judging means 14A is not able to judge the actual fault section.

When the relay action status of the switch at the load side of the fault section cannot be obtained, fault section expanding means 17 treats that switch similarly as a non-remote controlled switch, and further expands a section that is to be judged as a fault section to a switch at a further load side or a terminal section.

Figure 3:
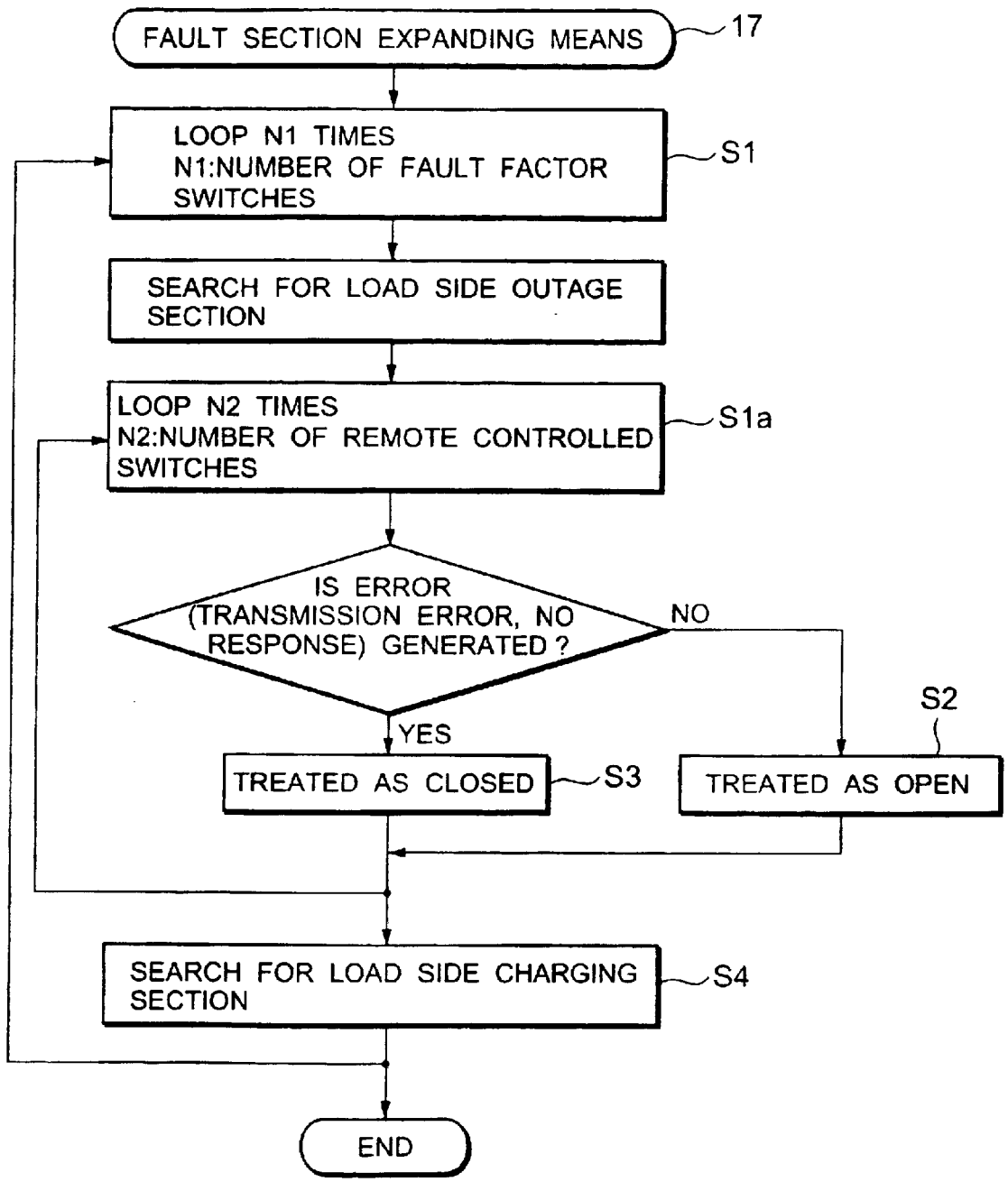
FIG. 3 is a flowchart showing one example of the process executed in the distribution network monitoring and control system according to the first embodiment of this invention.

FIG. 3 is a flowchart showing one example of the process executed in fault section expanding means 17. In distribution network monitoring and control system 1A, fault section expanding means 17 virtually simulates fault information, information on on/off status of switches, attributes of switches (remote controlled/non-remote controlled), and equipment information including mutual connection information between distribution sections, and executes the following processes.

First, when fault factor switch SW4 is opened in the distribution network system before fault, a load side outage section is searched and remote controlled switches belonging to the searched load side outage section are searched (a step S1). Then, out of the remote controlled switches belonging to the load side outage section switches of which relay action status could be taken are treated as being in an open state (steps S1$a$ and S2), and switches of which relay action status could not be taken for transmission error, no response, etc. are treated as being in a closed state (steps S1$a$ and S3). Thereafter, a load side charged section when fault factor switch SW4 is closed is searched (a step S4), and the charged section is treated as a fault section.

The process executed in fault section expanding means 17 shown in FIG. 3 will be explained in detail below. Here, it is assumed that a fault is generated in a section between switches SW7 and SW8 in FIG. 2. As described above, the fault factor switch is switch SW4, and a number N1 of the fault factor switches is "1". Accordingly, the loop shown in step S1 is executed only one time. Next, a load side outage section is searched, and sections between switches SW4 and tie switch TSW shown in FIG. 2 are decided as a load side outage section. Then, as a result of the search of the remote controlled switches included in the load side outage section, switches SW7 and SW9 are found to be remote controlled switches. Accordingly, a number N2 of the remote controlled switches is "2", and the loop shown in step S1a is executed two times for remote controlled switches SW7 and SW9. In a first loop of step S1a, as the relay action status of switch SW7 cannot be taken in, switch SW7 is treated as being in a closed state in step S3. In a second loop of step S1a, as the relay action status of switch SW9 can be taken in, switch SW9 is treated as being in an open state in step S2. After the completion of the second loop of step S1a, a load side charged section when fault factor switch SW4 is closed is searched (a step S4), and the charged section which is a section between switches SW4 and SW9 is treated as a fault section.

Fault section expanding means 17 judges a section between switches SW4–SW9 as a fault section, because switch SW7 is in the state of no response as shown in FIG. 2. Thereafter, distribution network monitoring and control system 1A opens switches SW4 and SW9 adjacent to the fault section, isolates the fault section, and recovers a power source side non-faulted section by closing feeder circuit breaker FCB by fault processing means 15.

As for restoring load side non-faulted section, CSS type recovering procedure preparation means 16A prepares the recovering procedure in consideration of the recovering distributing line allowable current of the recovered distribution line, and recovers the load side non-faulted section.

According to the embodiment described above, even if the status of the switches at a load side of the judged fault section could not be taken, it becomes possible to make a more adequate and accurate judgment of fault section by expanding a fault section to a further load side remote controlled switch or to a terminal section.

Second Embodiment

Figure 4:
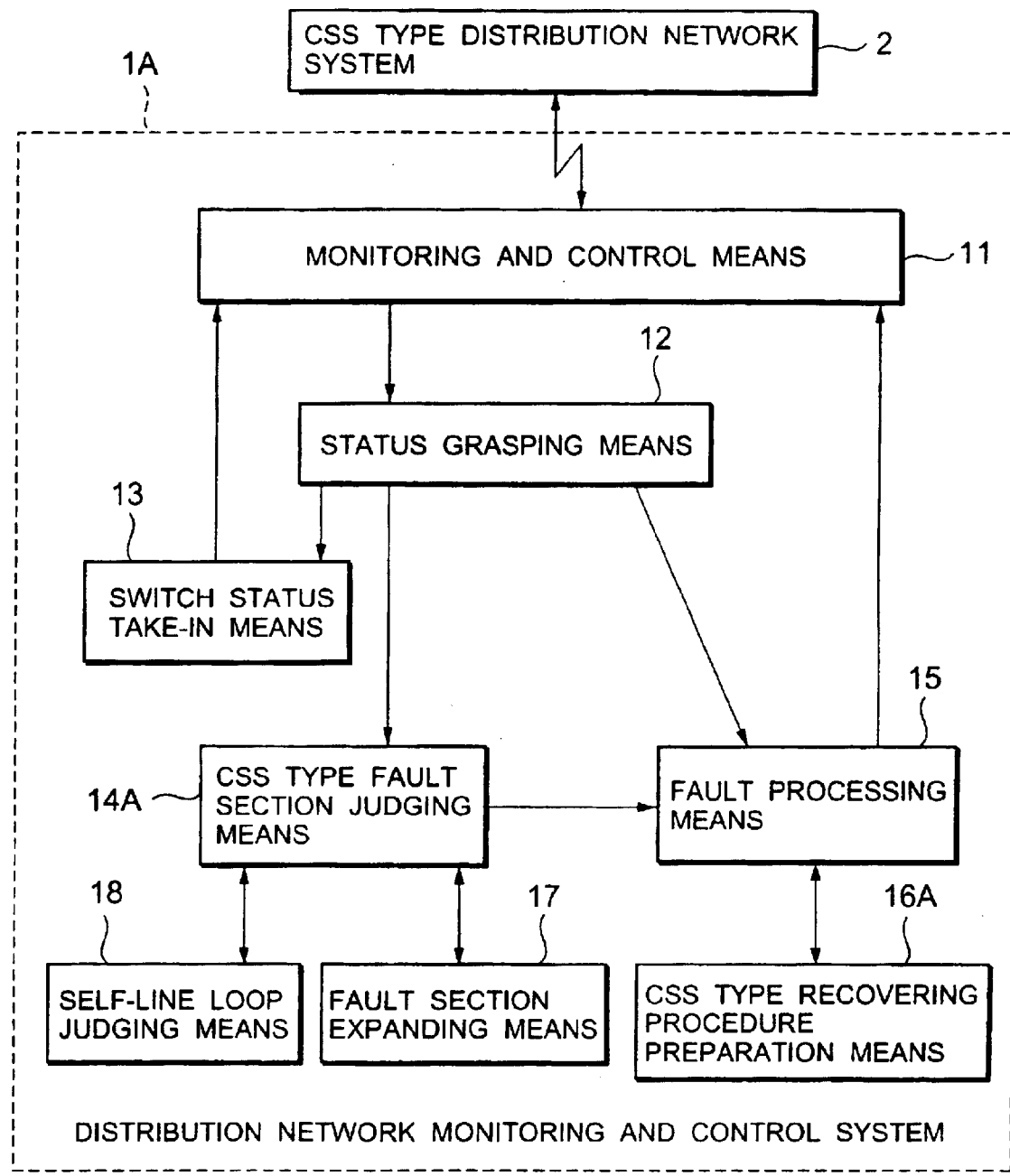
FIG. 4 is a block diagram showing the construction of a distribution network monitoring and control system according to a second embodiment of this invention.

Next, a second embodiment of this invention will be explained referring to FIG. 4. In the embodiment shown in FIG. 4, a self-line loop judging means 18 is added to distribution network monitoring and control system 1A in the first embodiment shown in FIG. 1. Self-line loop judging means 18 judges whether or not a self-line loop is present in CSS type distribution network system 2, and when there is a self-line loop, self-line loop judging means 18 treats switches in the self-line loop route as non-remote controlled switches.

Self-line loop judging means 18 judges whether or not a self-line loop is present in CSS type distribution network system 2 before fault by receiving system information before fault from CSS type fault section judging means 14A before making the judgment on a fault section. When there is a self-line loop, switches in the self-line loop route in CSS type distribution network system 2 are treated as non-remote controlled switches in distribution network monitoring and control system 1A. Thereafter, a fault section is judged by CSS type fault section judging means 14A and fault section expanding means 17.

Figure 5:
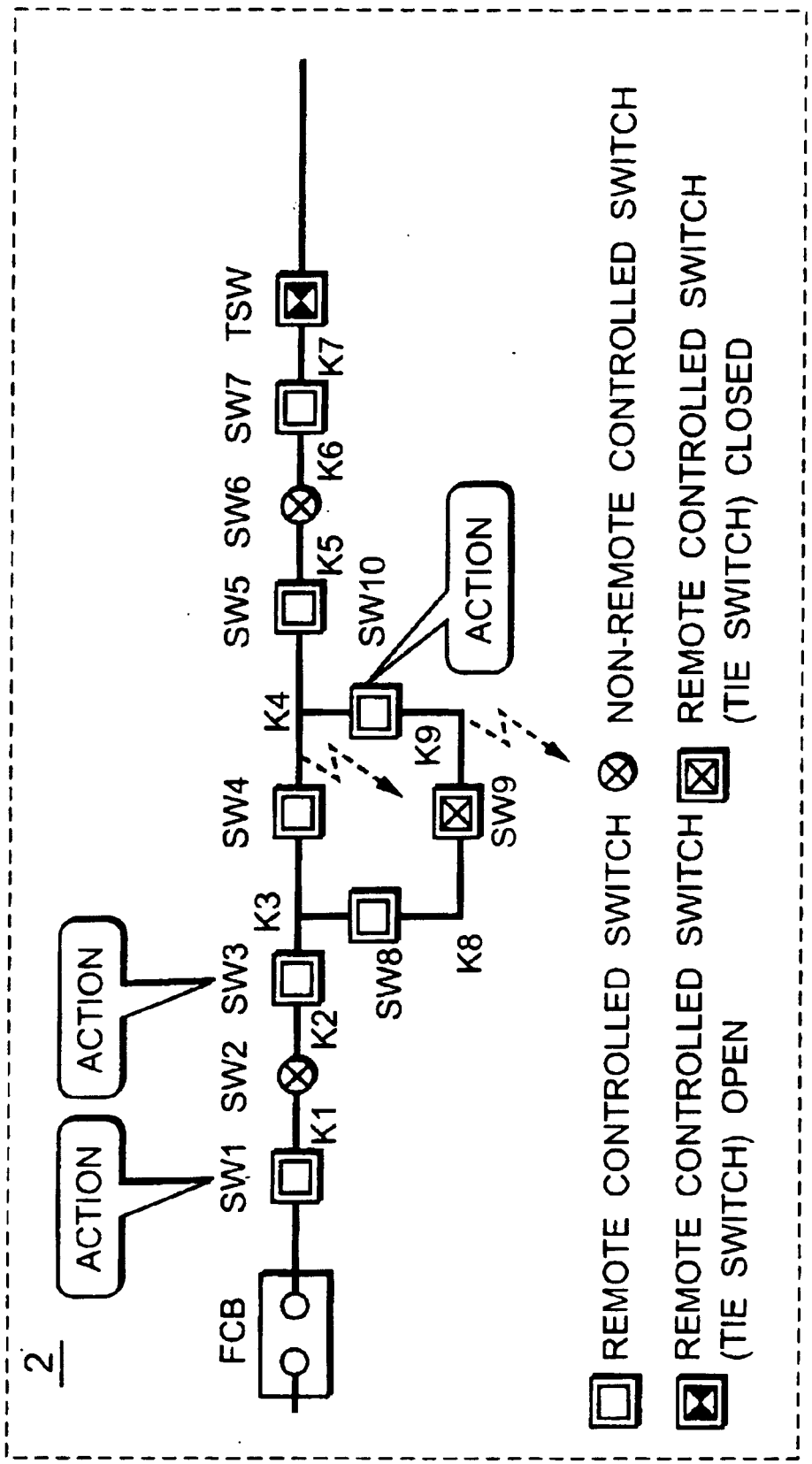
FIG. 5 is an explanatory diagram for explaining an action of the distribution network monitoring and control system according to the second embodiment of this invention.

FIG. 5 is a diagram for explaining the fault section judging process executed in distribution network monitoring and control system 1A in the second embodiment.

FIG. 5 shows the construction of a part of CSS type distribution network system 2. In FIG. 5, a feeder circuit breaker FCB, switches SW1–SW8, SW10 and tie switches SW9 and TSW are provided in CSS type distribution network system 2. Furthermore, for each switch, the type of the switch (remote controlled switch, remote controlled switch (tie switch) opened, non-remote controlled switch, or remote controlled switch (tie switch) closed) is shown with different symbol. Here, it is assumed that a fault is generated in a section K4 or a section K9.

CSS type distribution network system 2 shown in FIG. 5 is in the state of a self-line loop as tie switch SW9 is closed. When a distribution line fault is generated, distribution network monitoring and control system 1A receives relay action information of switches SW1, SW3 and SW10 from switch status take-in means 13 as fault information, and judges the load side section of switch SW10 which is most close to the load side as a fault section by CSS type fault section judging means 14A.

However, as switch SW10 is the switch in the self-line loop route as shown in FIG. 5, the flowing direction of power is not known, and therefore, whether a load side section is a section K4 or a section K9 cannot be specified. Further, because of in the self-line loop state, the fault information of switches in the self-line loop route may not be notified correctly.

Self-line loop judging means 18 expands fault sections by treating switches in the self-line loop route as non-remote controlled switches before judging fault sections by CSS type fault section judging means 14A.

Figure 6:
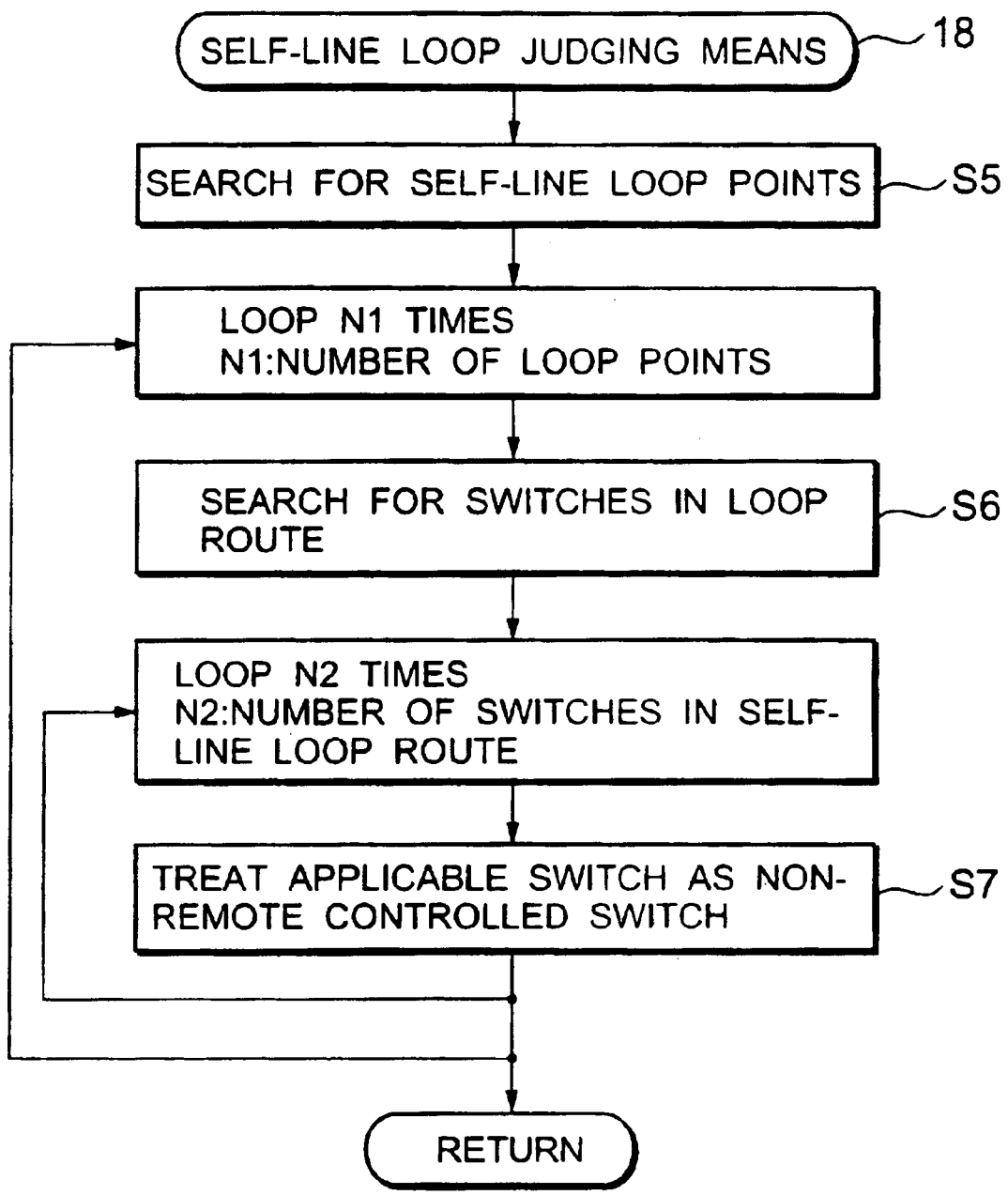
FIG. 6 is a flowchart showing one example of the process executed in the distribution network monitoring and control system according to the second embodiment of this invention.

FIG. 6 is a flowchart showing one example of the process executed in self-line loop judging means 18. In distribution network monitoring and control system 1A, self-line loop judging means 18 virtually simulates fault information, information on on/off state of switches, attributes of switches, and equipment information including mutual connection information between distribution sections, and executes the following processes.

In the explanations of the flow chart using FIG. 6 and the following drawings, only main points are described, and the description of the other points are omitted so as to avoid the duplicated explanation. Please refer to the description in the flow charts for the detailed explanation.

First, self-line loop points of applicable distribution lines are searched (a step S5). Then, when both side sections from the loop points are searched to the power source side (a step S6), switches at sections which are not overlapped each other are treated as switches in the loop route, and all switches in the loop route are treated as non-remote controlled switches (a step S7).

In FIG. 5, self-line loop judging means 18 treats switches SW4, SW8, SW9 and SW10 within the self-line loop route as non-remote controlled switches. CSS type fault section judging means 14A judges fault sections disregarding the relay's action of switch SW10 because switch SW10 is treated as a non-remote controlled switch, and section K3 is judged as a fault section. Thereafter, sections K3, K4, K8 and K9 are judged as fault sections by fault section expanding means 17.

According to this embodiment as described above, even when the fault factor switch is a switch within the self-line loop route, it is possible to judge all sections in the self-line loop route including the fault factor switch. Thereby it is possible to judge the fault section more adequately and accurately.

Third Embodiment

Figure 7:
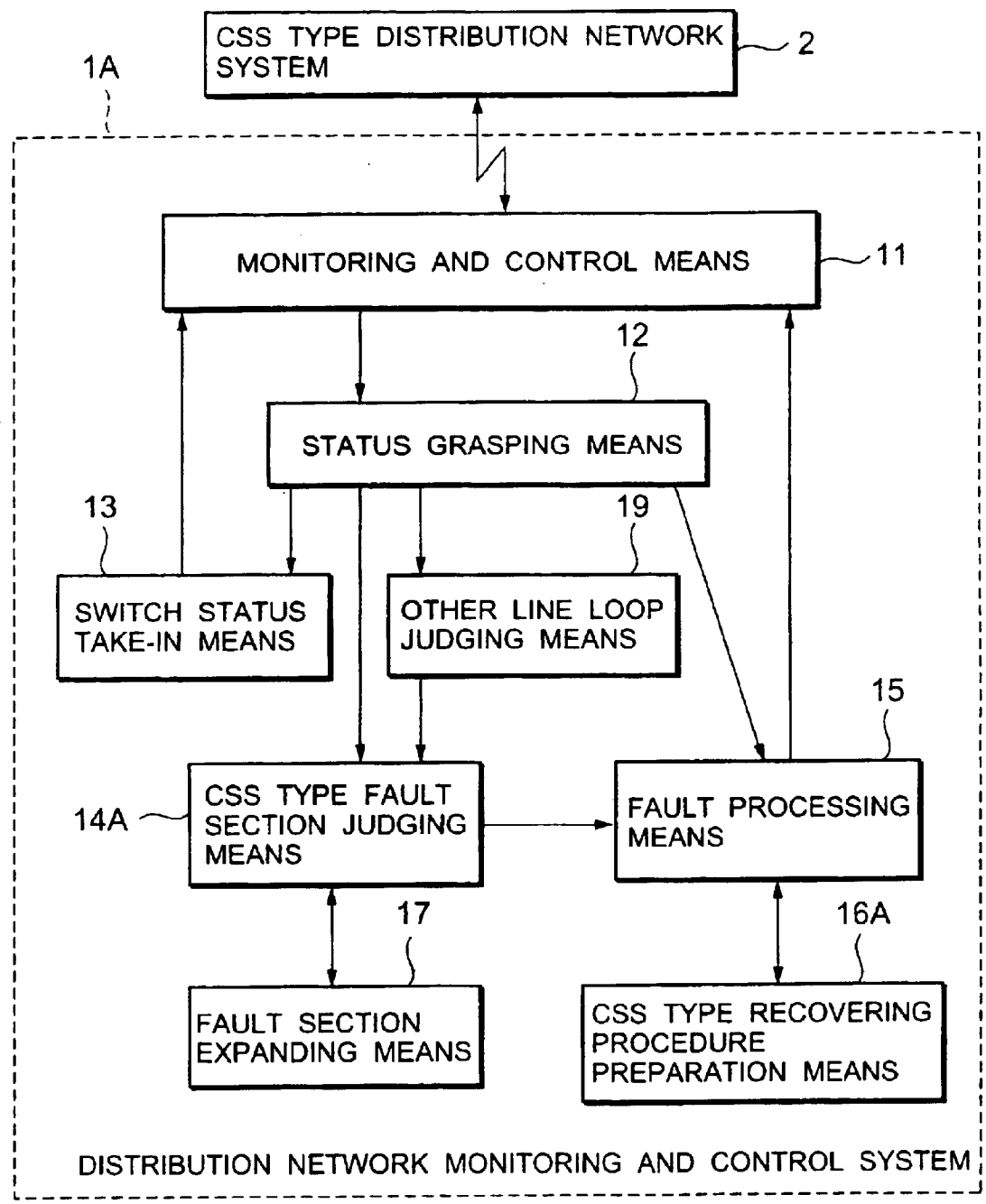
FIG. 7 is a block diagram showing the construction of a distribution network monitoring and control system according to a third embodiment of this invention.

Next, a third embodiment of this invention will be explained referring to FIG. 7. In the embodiment shown in FIG. 7, an other line loop judging means 19 to judge a fault in other line loop is added to distribution network monitoring and control system 1A in the first embodiment shown in FIG. 1.

Other line loop judging means 19 judges the state of other line loop in distribution network system 2 before fault, by receiving a trip notification of the feeder circuit breaker and system information before fault from state grasping means 12. Thereafter, when other line loop judging means 19 judges that a fault is generated in the other line loop, CSS type fault section judging means 14A judges that all sections are fault sections FIG. 8 is a diagram for explaining the fault section judging process executed in distribution network monitoring and control system 1A in the third embodiment.

Figure 8:
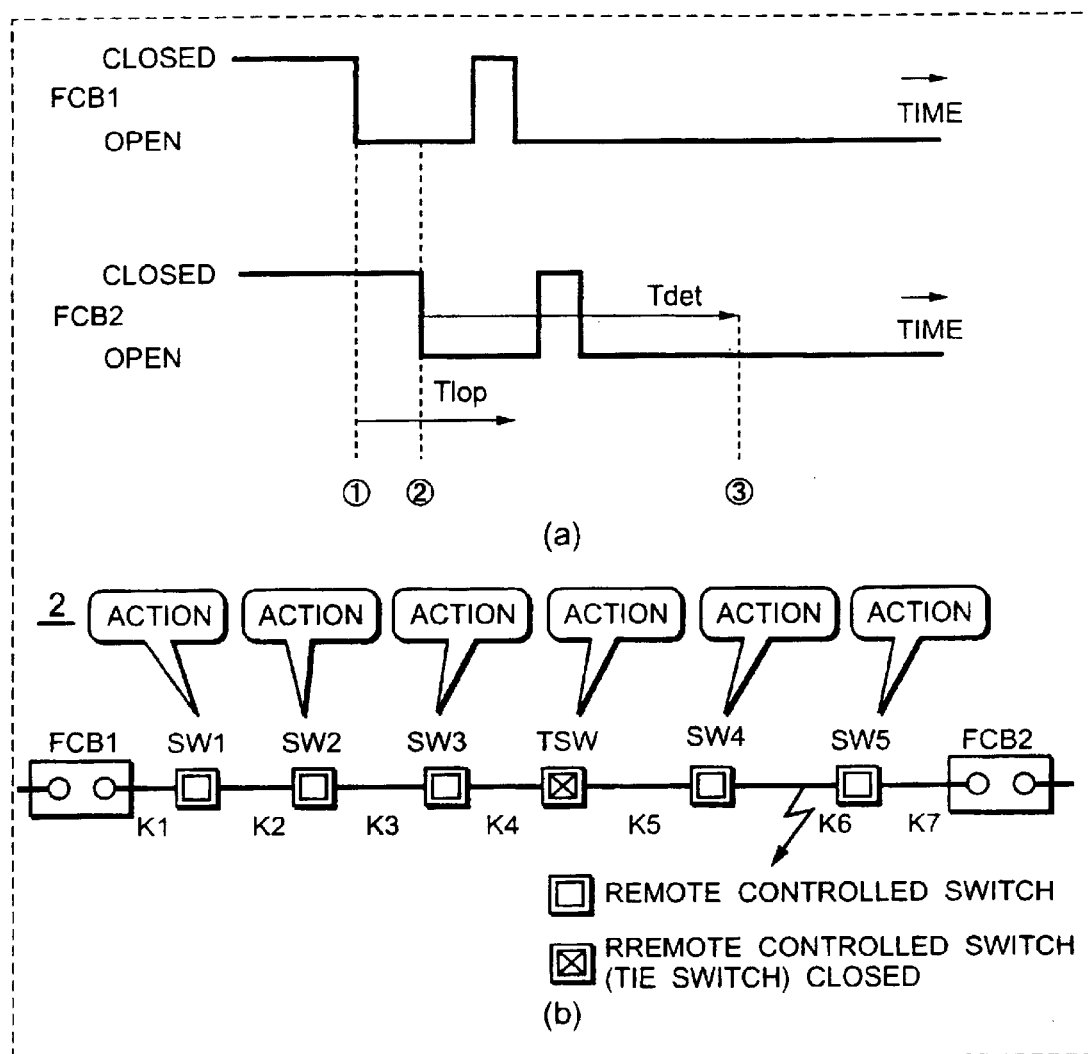
FIG. 8 is an explanatory diagram for explaining an action of the distribution network monitoring and control system according to the third embodiment of this invention.

In FIG. 8, FIG. 8(a) shows a timing chart of the fault section judging process and FIG. 8(b) shows the construction of a part of CSS type distribution network system 2. In FIG. 8(b), feeder circuit breakers FCB1 and FCB2, switches SW1–SW5 and a tie switch TSW are provided in CSS type distribution network system 2. Furthermore, for each switch, the type of the switch is shown with different symbol. Here, it is assumed that a fault is generated in a section K6 between switches SW4 and SW5.

CSS type distribution network system 2 shown in FIG. 8(b) is in the state of the other line loop. When a fault is generated in section K6, feeder circuit breakers FCB1 and FCB2 are tripped. Distribution network monitoring and control system 1A does not judge that a fault is generated because the outage is not generated when distribution circuit breaker FCB1 is opened by the status grasping means 12. But distribution network monitoring and control system 1A judges that a fault is generated because the outage is generated when feeder circuit breaker FCB2 is opened by the status grasping means 12.

Distribution network monitoring and control system 1A takes in the status of switches SW1–SW5 and tie switch TSW by switch status take-in means 13 and recognizes that the relays of all switches are acting. In this case, CSS type fault section judging means 14A erroneously judges that a section K1 which is a load side section of a fault factor switch is a fault section according to taken-in fault information of all the switches.

Here, other line loop judging means 19 judges whether or not a fault is generated in the other line loop. When a fault is generated in the other line loop, other line loop judging means 19 judges that all sections are in the fault state.

Figure 9:
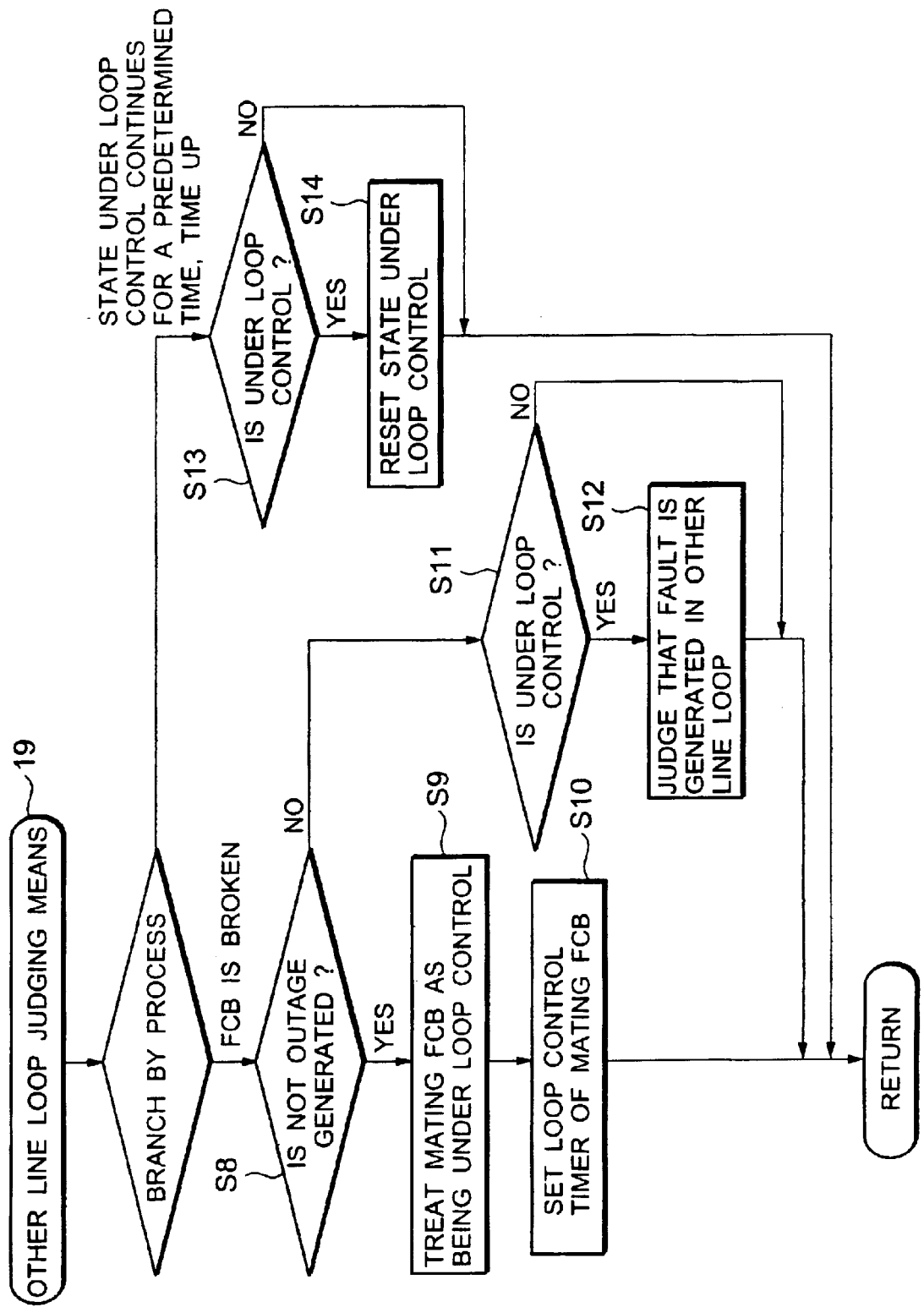
FIG. 9 is a flowchart showing one example of the process executed in the distribution network monitoring and control system according to the third embodiment of this invention.

FIG. 9 is a flowchart showing one example of the process executed in other line loop judging means 19. Other line loop judging means 19 judges whether or not an outage is generated when feeder circuit breaker FCB1 or FCB2 is opened (a step S8), and when the outage is not generated, judges that a fault is generated in the other line loop, places feeder circuit breaker FCB1 or FCB2 of a mating loop line under a loop control state (a step S9), and sets a loop control timer (a step S10). Other line loop judging means 19 judges whether or not applicable feeder circuit breaker FCB1 or FCB2 is under the control state when outage is generated by opening feeder circuit breaker FCB1 or FCB2 (a step S11), and judges that a fault is generated in the other line loop when the feeder circuit breaker FCB1 or FCB2 is under the loop control state (a step S12). Further, whether or not the state under loop control continues for a definite time Tlop is judged (a step S13) and when the state continues for more than definite time Tlop, the state under loop control is reset (a step S14).

In FIG. 8, other line loop judging means 19 judges that a fault is generated in the other line loop because the trip of feeder circuit breaker FCB2 is generated (FIG. 8(a) at a time ②) during the loop control state. Then, after a time Tdet passed, a fault section is judged because feeder circuit breaker FCB2 is in the open state, and all sections are judged to be fault sections because the fault is generated in other line loop.

According to this embodiment as described above, in the fault section judgment under the other line loop state, all sections can be judged as fault sections when the fault is generated in other line loop, and thus, fault sections can be judged adequately and accurately.

Fourth Embodiment

Figure 10:
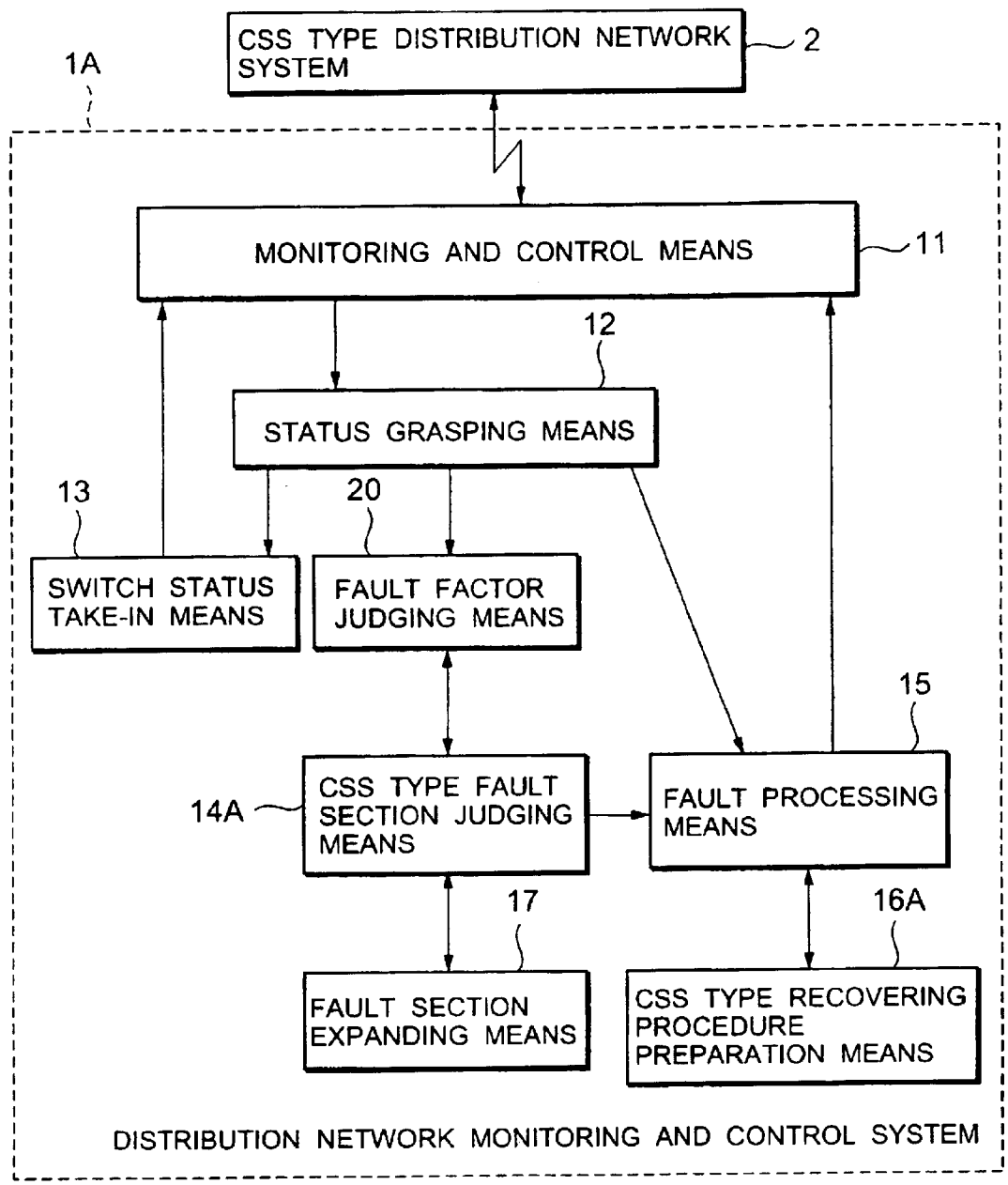
FIG. 10 is a block diagram showing the construction of a distribution network monitoring and control system according to a fourth embodiment of this invention.

Next, a fourth embodiment of this invention will be explained referring to FIG. 10. In the embodiment shown in FIG. 10, a fault factor judging means 20 is added to distribution network monitoring and control system 1A in the first embodiment shown in FIG. 1. Fault factor judging means 20 is to judge fault factor for every fault information from a plurality of different fault informations of switches.

Fault factor judging means 20 classifies the fault informations into the relay action state for every fault factor before judging a fault section by CSS type fault section judging means 14A in response to a notice from status grasping means 12, and fault section is judged by CSS type fault section judging means 14A for every fault factor.

Figure 11:
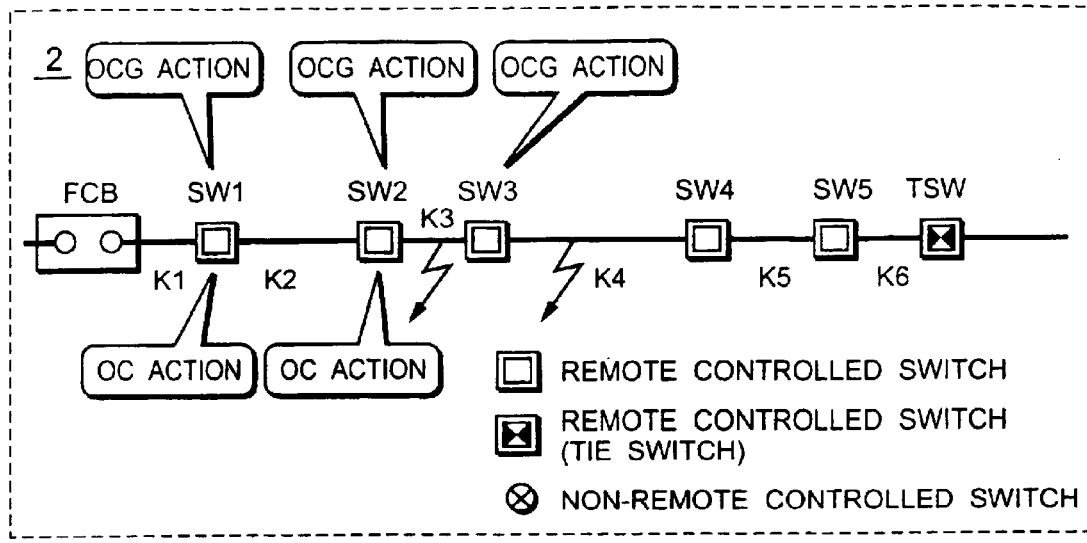
FIG. 11 is an explanatory diagram for explaining an action of the distribution network monitoring and control system according to the fourth embodiment of this invention.

FIG. 11 is a diagram for explaining the fault section judging process executed in distribution network monitoring and control system 1A in the fourth embodiment.

FIG. 11 shows the construction of a part of CSS type distribution network system 2. In FIG. 11, a feeder circuit breaker FCB, switches SW1–SW5, and a tie TSW are provided in CSS type distribution network system 2. Furthermore, for each switch, the type of the switch is shown with different symbol.

In CSS type distribution network system 2 shown in FIG. 11, it is assumed that a short-circuit fault is generated in a section K3 and a ground fault is generated in a section K4. Distribution network monitoring and control system 1A receives a plurality of different fault informations of switches by switch status take-in means 13. CSS type fault section judging means 14A judges a load side section K4 only of switch SW3 which is most close to the load as a fault section among switches of which fault informations were received without taking into consideration of the type of the fault information.

Here, fault factor judging means 20 enables the fault section judgment for every fault factor by judging a fault section for each fault factor.

Figure 12:
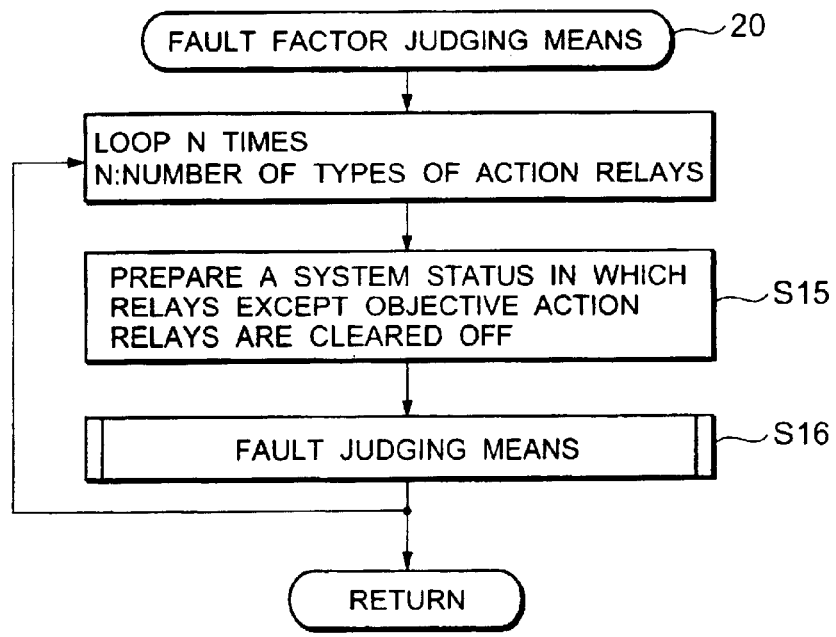
FIG. 12 is a flowchart showing one example of the process executed in the distribution network monitoring and control system according to the fourth embodiment of this invention.

FIG. 12 is a flowchart showing one example of the process executed in fault factor judging means 20.

In distribution network monitoring and control system 1A, fault factor judging means 20 virtually simulates fault information, information on on/off state of switches, attributes of switches, and equipment information including mutual connection information between distribution sections, and executes the following processes.

First, a simulated system is prepared in which any relay other than an objective action relay is cleared off for each type of action relay (a step S15). Then, fault factor judging means 20 notifies CSS type fault judging means 14A of the virtually simulated system, and a fault section is judged (a step S16) in CSS type fault judging means 14A.

Thus, it becomes possible to determine a fault section for each fault factor.

In FIG. 11, fault factor judging means 20 first requests the judgment of a fault section due to a ground fault notified by an OCG relay (Over Current of Ground Relay) to CSS type fault section judging means 14A, and CSS type fault section judging means 14A judges that a fault is generated in section K4. Then, fault factor judging means 20 requests the judgment of a fault section due to a short-circuit fault notified by OC relay (Over Current Relay) to CSS type fault section judging means 14A, and CSS type fault section judging means 14A judges that a fault is generated in section K3.

Thus, it is possible to judge that the fault sections are section K3 and section K4.

According to this embodiment as described above, a fault section can be judged for every type of fault information even when a plurality of fault information are received from CSWs, and thus, fault section can be judged adequately and accurately.

Fifth Embodiment

Figure 13:
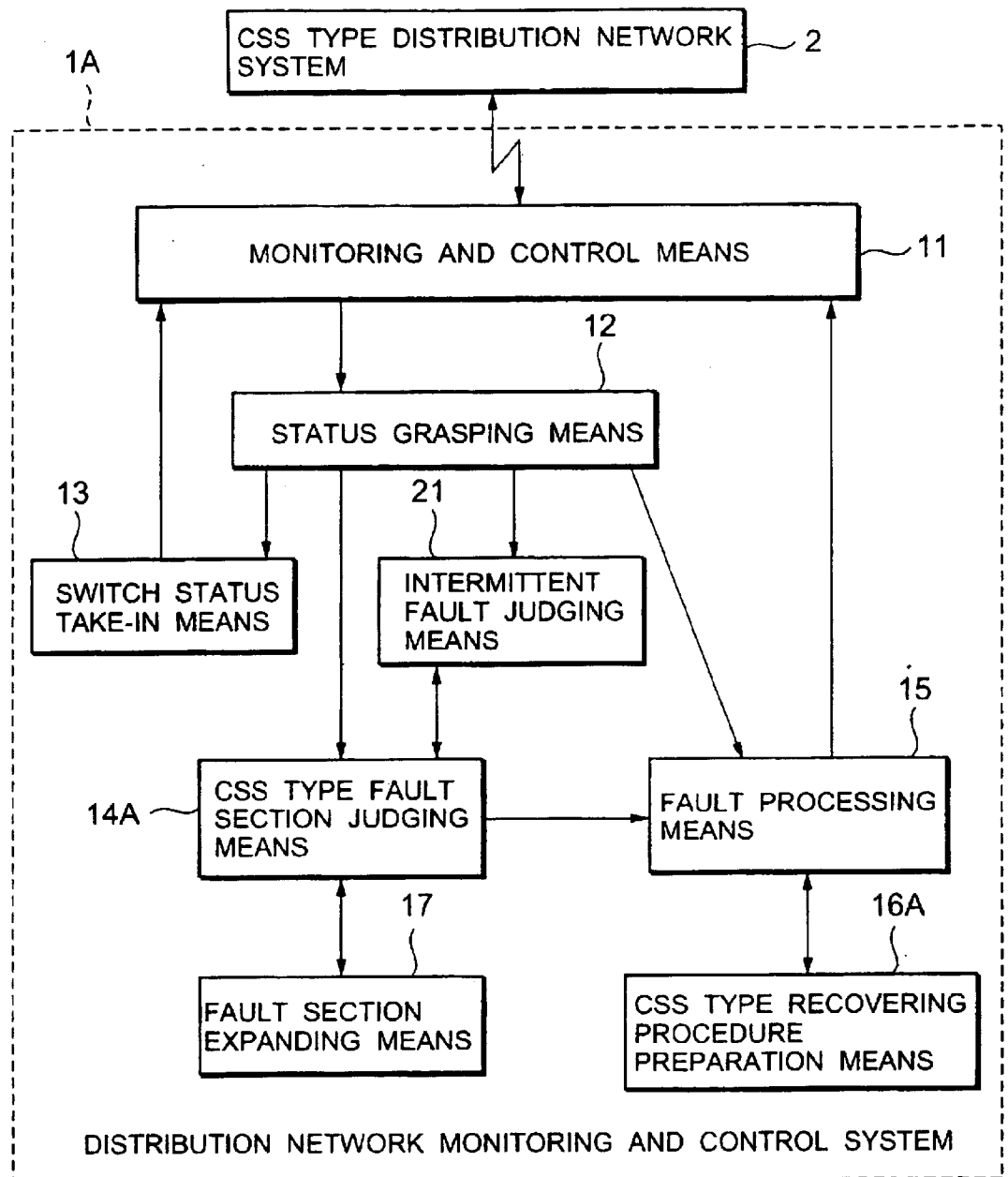
FIG. 13 is a block diagram showing the construction of a distribution network monitoring and control system according to a fifth embodiment of this invention.

Next, a fifth embodiment of this invention will be explained referring to FIG. 13. In the embodiment shown in FIG. 13, an intermittent fault judging means 21 is added to distribution network monitoring and control system 1A of the first embodiment shown in FIG. 1. Intermittent fault judging means 21 is to detect a fault section even in the case of a reclosing success fault. When the fault is judged as an intermittent fault, intermittent fault judging means 21 judges fault section detecting results within a certain time period as being all fault sections.

Intermittent fault judging means 21 is notified of a trip of feeder circuit breaker FCB from status grasping means 12. Further, when the reclosing is successful, intermittent fault judging means 21 is notified of the fault-section judged by CSS type fault section judging means 14A, stores the fault section and places it under the intermittent fault control. When intermittent fault judging means 21 is notified of the trip of feeder circuit breaker FCB from status grasping means 12 during the intermittent fault control, intermittent fault judging mean 21 judges that the fault is an intermittent fault. Thereafter, CSS type fault section judging means 14A takes out all fault sections stored in intermittent fault judging means 21 and notifies them to fault processing means 15.

Figure 14:
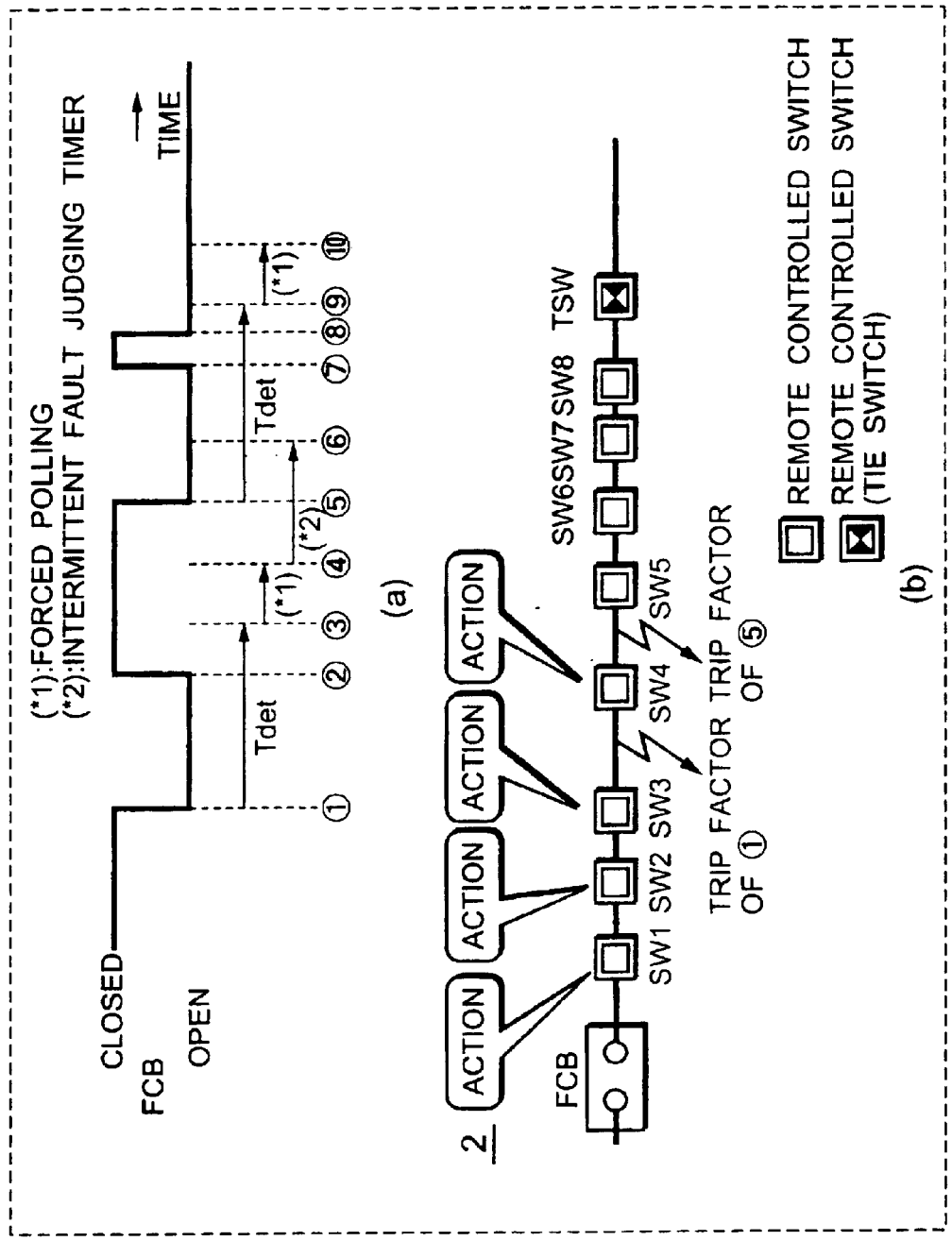
FIG. 14 is an explanatory diagram for explaining an action of the distribution network monitoring and control system according to the fifth embodiment of this invention.

FIG. 14 is a diagram for explaining the fault section judging process executed in distribution network monitoring and control system 1A in the fifth embodiment.

In FIG. 14, FIG. 14(a) shows a timing chart of the fault section judging process and FIG. 14(b) shows the construction of a part of CSS type distribution network system 2. In FIG. 14(b), a feeder circuit breaker FCB, switches SW1–SW8 and a tie switch TSW are provided in CSS type distribution network system 2. Furthermore, for each switch, the type of the switch is shown with different symbol. Here, it is assumed that a first fault is generated in a section between switches SW3 and SW4 and a second fault is generated in a section between switches SW4 and SW5.

In CSS type distribution network system 2 shown in FIG. 14(b), distribution network monitoring and control system 1A detects an initial trip of feeder circuit breaker FCB by status grasping means 12 (FIG. 14(a) at a time ①).

When a distribution line fault is generated, the relay actions are notified to distribution network monitoring and control system 1A from the switches of CSS type distribution network system 2. When the circuit is reclosed by the function of feeder circuit breaker FCB (FIG. 14(a) at a time ②) and the reclosing is successful, according to the conventional technology, the fault section judgment is not carried out, the fault information of switches is cleared off and the fault processing is terminated. Thereafter, when a second trip is caused (FIG. 14(a) at a time ⑤) and feeder circuit breaker FCB at a time after time Tdet from the trip is in the open state, CSS type fault section judging means 14A executes the judgment of fault section, and judges a section between switches SW4–SW5 as a fault section. However, if there is a factor for intermittent fault in a section between switches SW3–SW4, feeder circuit breaker FCB may possibly be tripped when feeder circuit breaker FCB is closed for the recovery of the power source side.

A method to judge an intermittent fault by intermittent fault judging means 21 will be explained below.

In order to deal with an intermittent fault, distribution network monitoring and control system 1A takes in the status of switches located in a range to which power was transmitted before the fault through the feeder that generated the fault at a time after a determined time passed from the generation of the fault by switch status take-in means 13 even when the circuit was reclosed successfully (FIG. 14(a) at a time ③). CSS type fault section judging means 14A judges a section between switches SW3 to SW4 that is a load side section of the fault factor switch as a fault section out of CSWs of which fault information was notified, and notifies the judged fault section to intermittent fault judging means 21.

Figure 15:
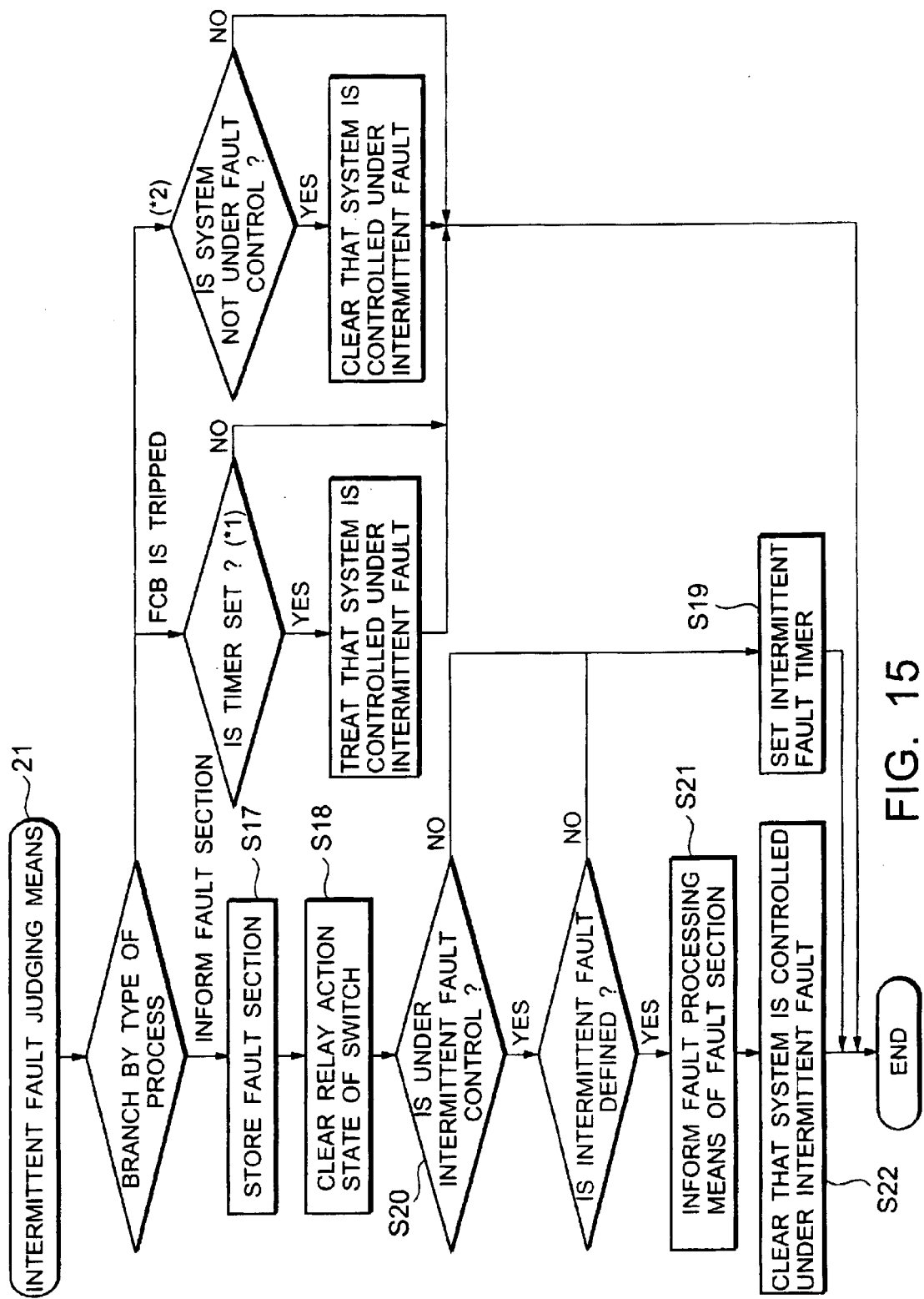
FIG. 15 is a flowchart showing one example of the process executed in the distribution network monitoring and control system according to the fifth embodiment of this invention.

FIG. 15 is a flowchart showing one example of the process executed in intermittent fault judging means 21. When fault sections are notified, intermittent fault judging means 21 stores the notified fault section for each fault feeder (a step S17), clears off the relay action state of CSWs (S18) and sets an intermittent fault judging timer (a step S19, FIG. 14(a) at a time ④). When the same feeder is tripped within a time period set by the intermittent fault timer (FIG. 14(a) at a time ⑤), intermittent fault judging means 21 judges that an intermittent fault is generated and places the feeder in the intermittent fault control (a step S20). After a second trip is generated, a section between switches SW4 to SW5 is judged as a fault section by switch status take-in means 13 and CSS type fault section judging means 14A, and the judged fault section is notified to intermittent fault judging means 21 (a step S21).

Intermittent fault judging means 21 additionally stores the notified fault section in the fault section information provided for each fault feeder, and clears off the relay action status of the switches. When it is decided that the fault is an intermittent fault, intermittent fault judging means 21 notifies CSS type fault judging means 14A of the fault section stored result, and clears an under intermittent fault control flag (a step S22)

CSS type fault section judging means 14A judges a section between switches SW3–SW5 that is a combined section of the initial trip fault section and the second trip fault section as a fault section according to the notification from intermittent fault judging means 21. Thereafter, distribution network monitoring and control system 1A breaks switches SW3 and SW5 adjacent to the fault section by fault processing means 15, isolates the fault section and recovers the power source side non-faulted section by closing feeder circuit breaker FCB. The load side non-faulted section is recovered by preparing recovering procedure in consideration of the distribution line allowable current of the recovered distribution line by CSS type recovering procedure preparing means 16A.

According to this embodiment as described above, even when a plurality of intermittent fault sections are generated in a range from feeder circuit breaker FCB to the terminal fault section, fault sections can be judged adequately and accurately by storing the fault section for each trip of feeder circuit breaker FCB and by clearing off the relay informations of the CSWs that become factors for judging fault sections.

Sixth Embodiment

Figure 34:
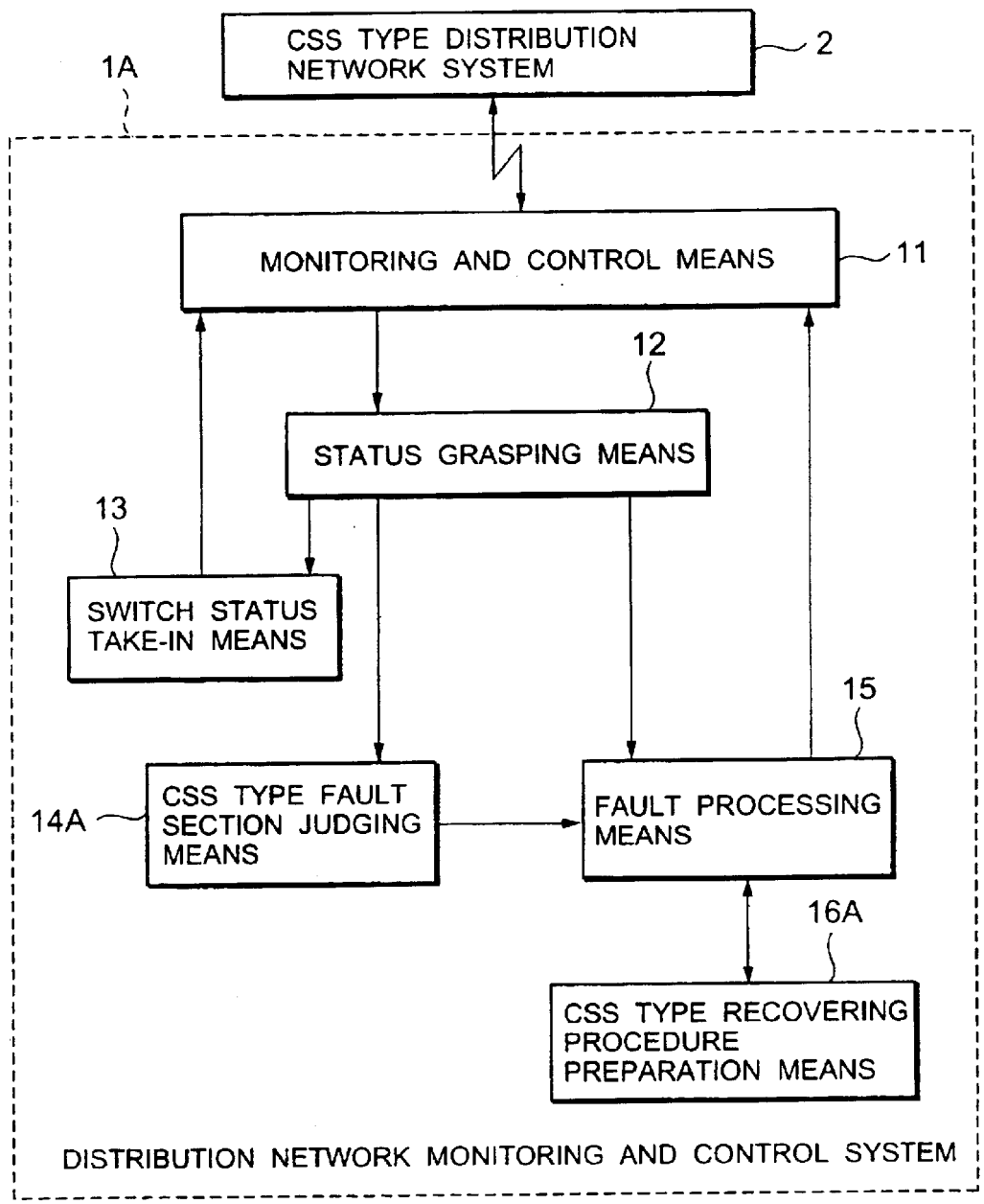
FIG. 34 is a block diagram showing the construction of a conventional distribution network monitoring and control system.
Figure 35:
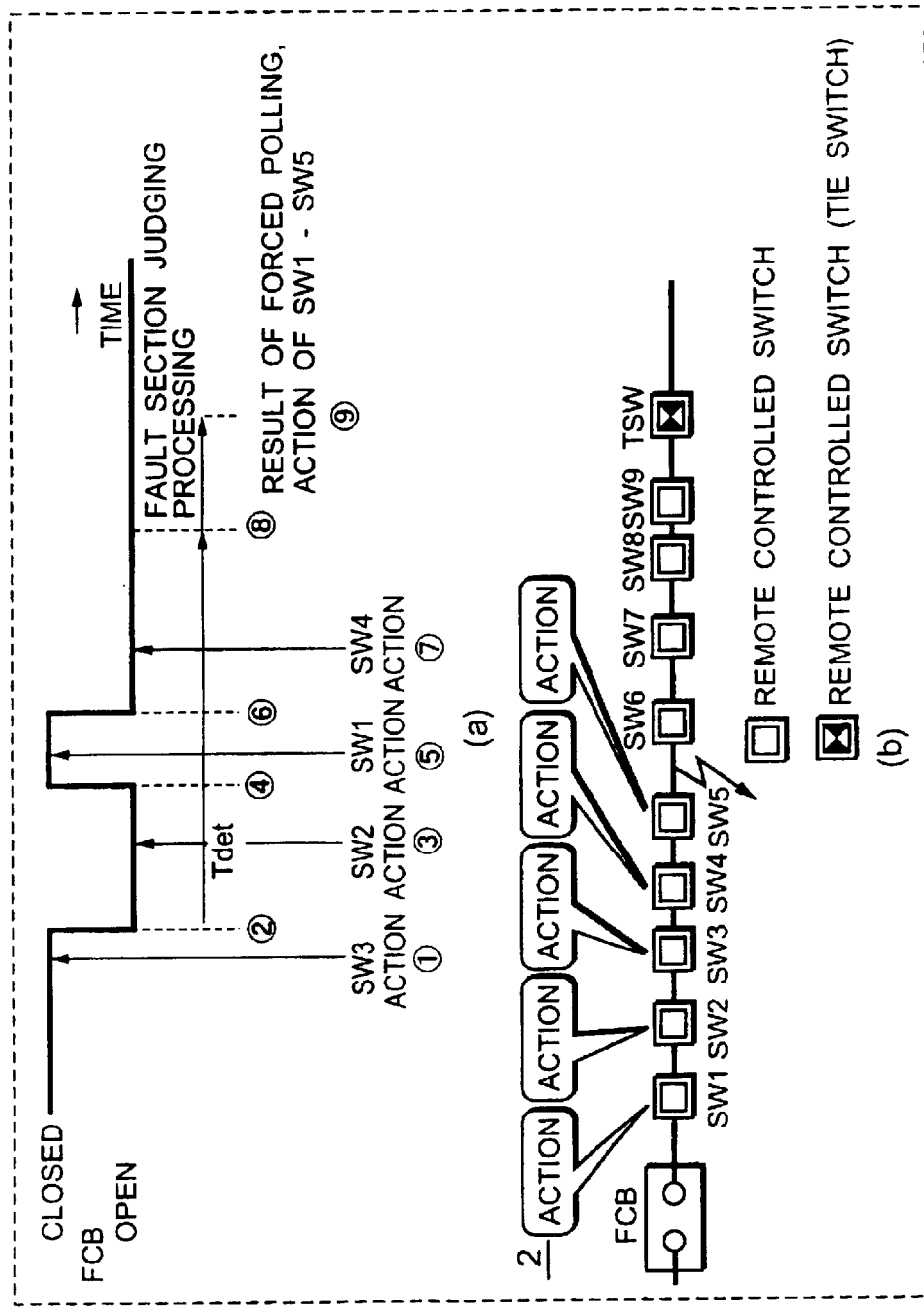
FIG. 35 is an explanatory diagram for explaining an action of the conventional distribution network monitoring and control system.
Figure 36:
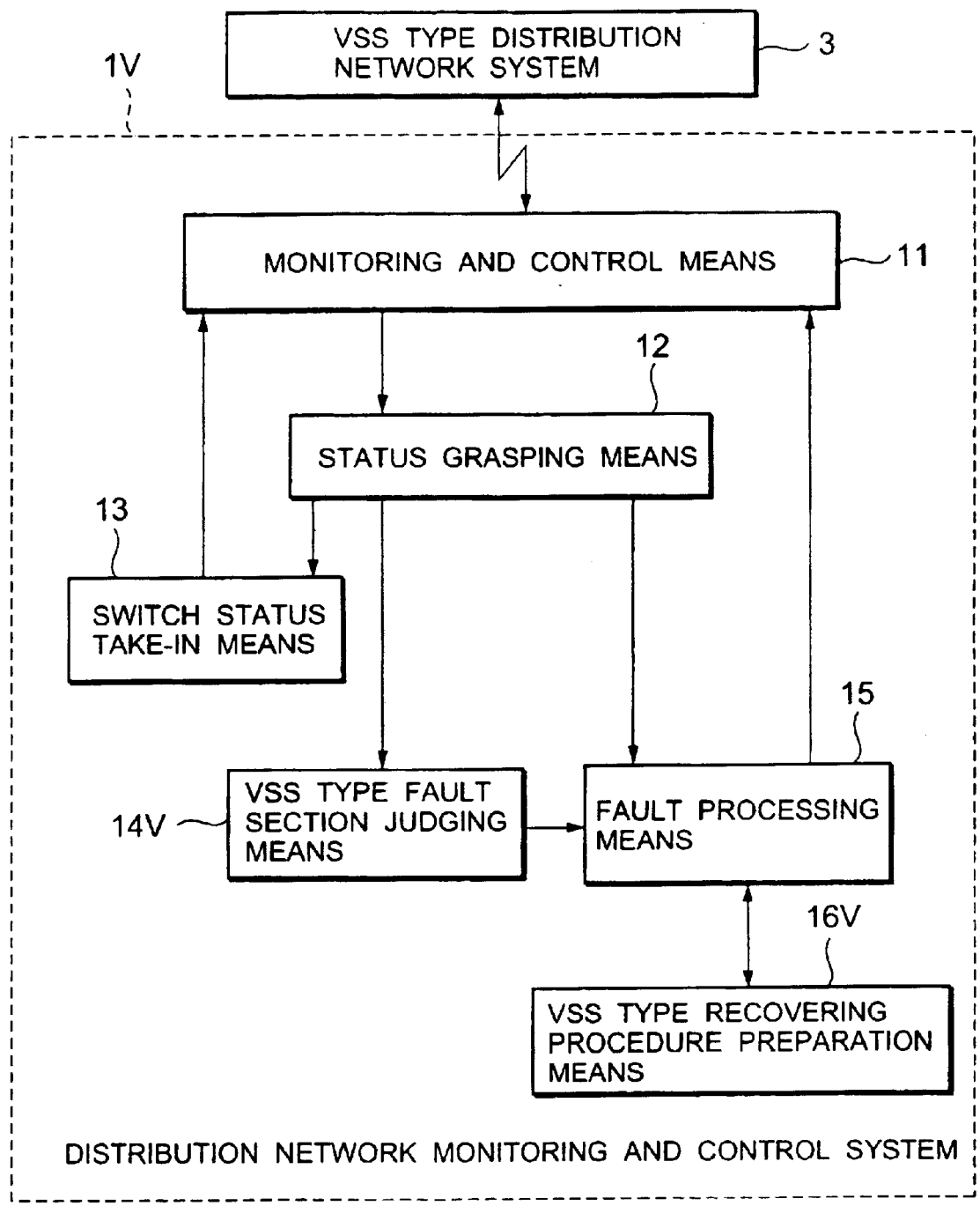
FIG. 36 is a block diagram showing the construction of a conventional distribution network monitoring and control system.

Next, a sixth embodiment of this invention will be explained referring to FIG. 16. In the embodiment shown in FIG. 16, a distribution network monitoring and control system 1 which monitors and controls a mixed type distribution network system 4 wherein VSWs and CSWs are provided in mix is composed as follows:

VSS type fault section judging means 14V, VSS type recovering procedure preparing means 16V shown in FIG. 36 and a fault processing system selecting means 22 are added to conventional distribution network monitoring and control system 1A shown in FIG. 34. Here, fault processing system selecting means 22 is to select a fault processing system according to an operator's judgment and setting when a distribution line fault is generated.

Fault processing system selecting means 22 selects either a VSS type fault processing system or a CSS type fault processing system according to an operator's judgment and setting when a fault section judging request is received from status grasping means 12. In the case that VSS type fault processing system is selected, the fault section judgment request is outputted to VSS type fault section judging means 14V, and in the case that CSS type fault section processing system is selected, the fault section judgment request is outputted to CSS type fault section judging means 14A.

Figure 17:
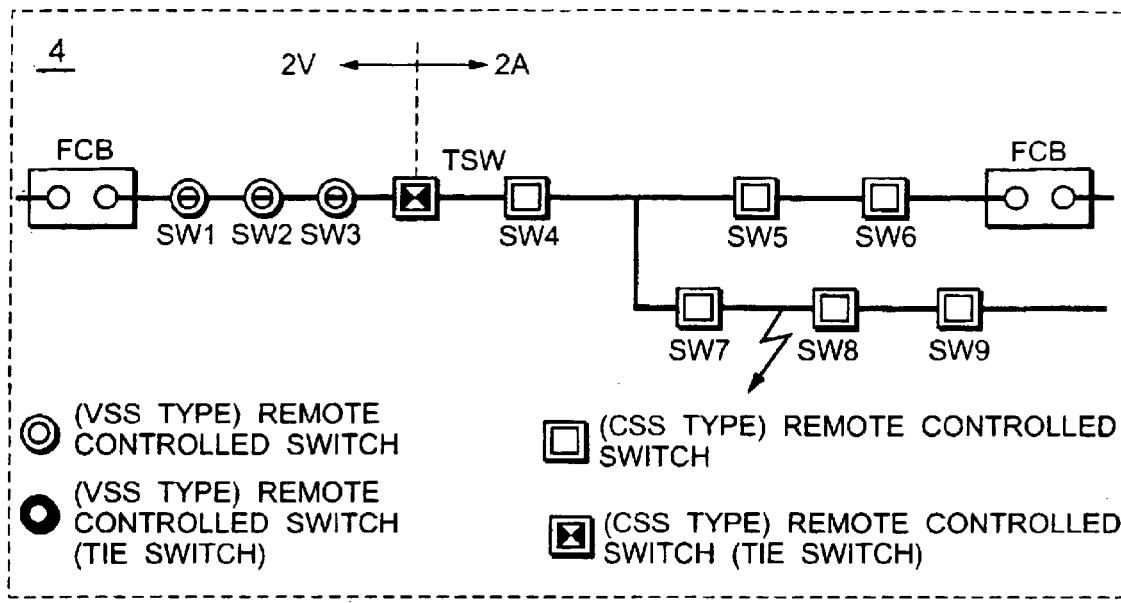
FIG. 17 is an explanatory diagram for explaining an action of the distribution network monitoring and control system according to the sixth embodiment of this invention.

FIG. 17 is a diagram for explaining the fault section judging process executed in distribution network monitoring and control system 1 according to the sixth embodiment.

In FIG. 17, mixed type distribution network system 4 is composed of a distribution network system 2V and a distribution network system 2A.

FIG. 17 shows the construction of a part of mixed type distribution network system 4. Here, mixed type distribution network system 4 is composed of a distribution network system 2V wherein only VSWs are provided and a distribution network system 2A wherein only CSWs are provided. In FIG. 17, feeder circuit breakers FCB, switches SW1–SW9, and a tie TSW are provided in mixed type distribution network system 4. Furthermore, for each switch, the type of the switch ((VSS type) remote controlled switch, (VSS type) remote controlled switch (tie switch), (CSS type) remote controlled switch or (CSS type) remote controlled switch (tie switch)) is shown with different symbol.

In mixed type distribution network system 4 shown in FIG. 17, it is assumed that a fault is generated in a section between CSWs SW7 and SW8.

When a distribution line fault is generated in mixed type distribution network system 4 wherein VSWs and CSWs are provided in mix as shown in FIG. 17, a fault section may not be detected by the VSS type fault processing system only or the CSS type fault processing system only. In FIG. 17, if a fault is generated in the distribution line in the section between CSWs SW7–SW8 and the only VSS type fault processing system is applicable to distribution network system 2A, it is impossible to detect a fault section because distribution network system 2A is composed of CSWs. But according to this embodiment, distribution network monitoring and control system 1 is capable of selecting a fault processing system for each distribution network system according to an operator's judgment by fault processing system selecting means 22.

Figure 18:
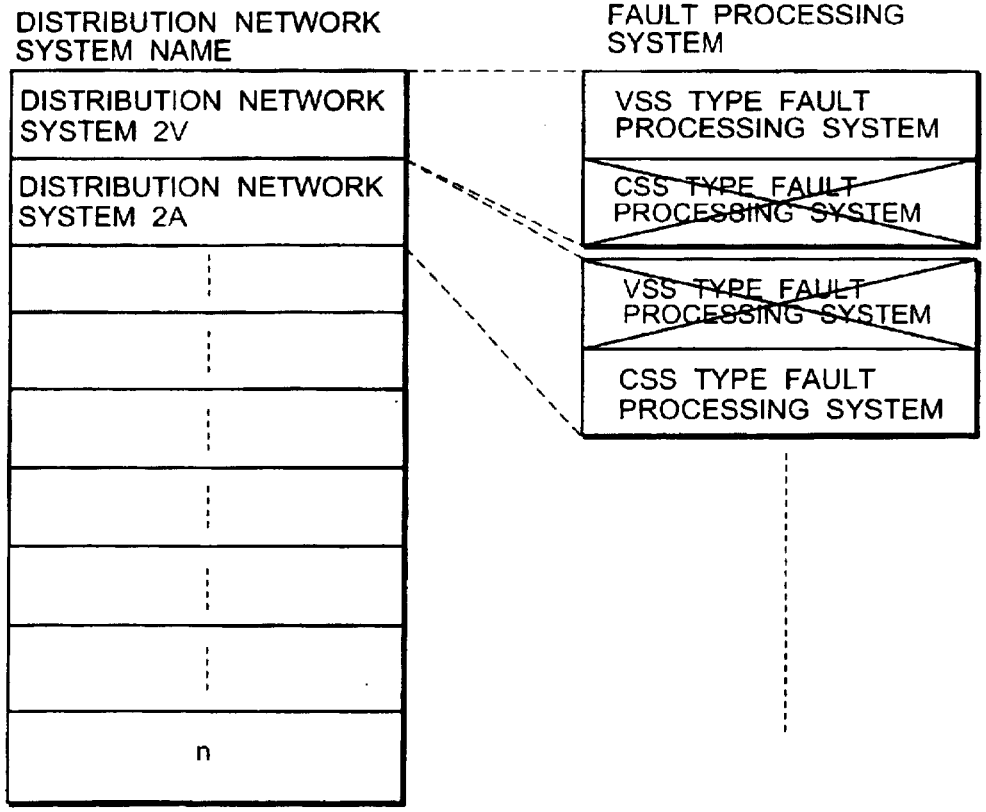
FIG. 18 is a diagram showing one example of the process executed in the distribution network monitoring and control system according to the sixth embodiment of this invention.

FIG. 18 shows one example of a fault processing system selected for each distribution network system in fault processing system selecting means 22. As shown in FIG. 18, as distribution network system 2V is composed of VSWs, the VSS type fault processing system is set. As distribution network system 2A is composed of CSWs, the CSS type fault processing system is set. Thus, in mixed type distribution network system 4 shown in FIG. 17, a fault section can be detected for each distribution network system 2V or 2A.

According to this embodiment as described above, a fault section can be judged adequately and accurately because an operator can decide a fault processing system according to various phenomena.

Seventh Embodiment

Figure 19:
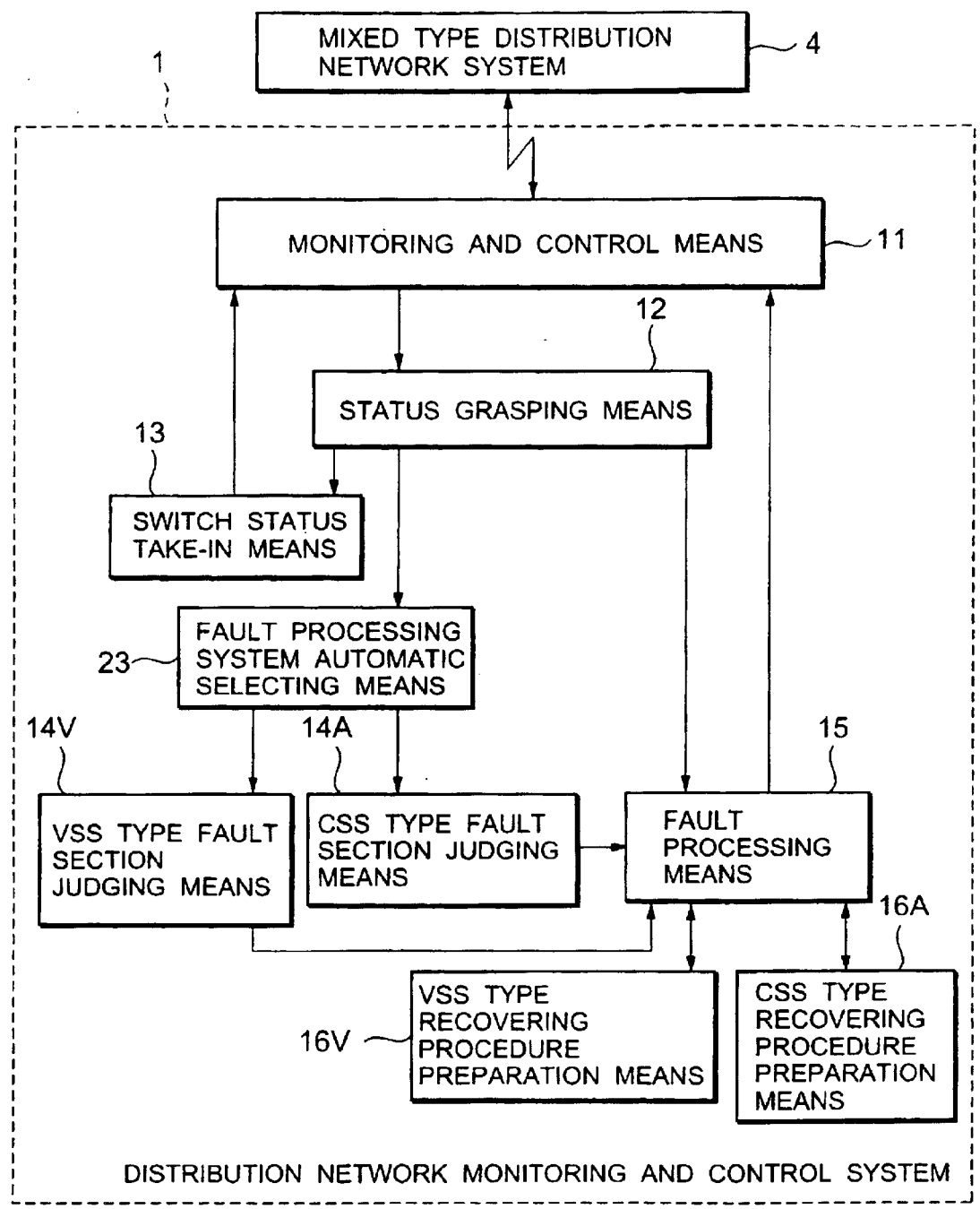
FIG. 19 is a block diagram showing the construction of a distribution network monitoring and control system according to a seventh embodiment of this invention.

Next, a seventh embodiment of this invention will be explained referring to FIG. 19. In the embodiment shown in FIG. 19, distribution network monitoring and control system 1 which monitors and controls mixed type distribution network system 4 is composed as follows:

VSS type fault section judging means 14V, VSS type recovering procedure preparing means 16V shown in FIG. 36 and a fault processing system automatic selecting means 23 are added to conventional distribution network monitoring and control system 1A shown in FIG. 34. Here, fault processing system automatic selecting means 23 is to automatically select a fault processing system when a distribution line fault is generated.

Fault processing system automatic selecting means 23 selects a fault processing system automatically according to pre-set conditions such as a type of the applicable distribution line, an equipment information, and system status, etc., when a fault section judgment is requested from status grasping means 12. A fault section judging request is outputted to VSS type fault section judging means 14V in the case that VSS type fault processing system is selected. A fault section judging request is outputted to CSS type fault section judging means 14A in case that CSS type fault processing system is selected.

Figure 20:
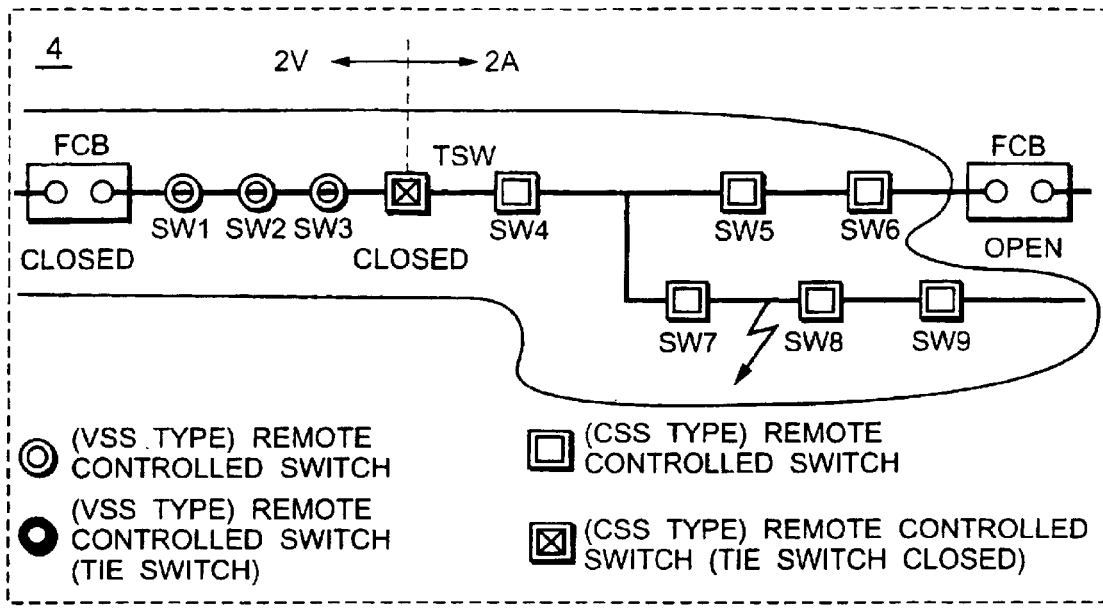
FIG. 20 is an explanatory diagram for explaining an action of the distribution network monitoring and control system according to the seventh embodiment of this invention.

FIG. 20 is a diagram for explaining the fault section judging process executed in the distribution network monitoring and control system 1 according to a seventh embodiment.

FIG. 20 shows the construction of a part of mixed type distribution network system 4. Here, the construction of mixed type distribution network system 4 shown in FIG. 20 is the same as that shown in FIG. 17 except as follows:

The status of feeder circuit breakers FCB are shown (one is closed, and the other is open), and tie switch TSW is in closed state, and a symbol of ((CSS type) remote controlled switch (tie switch) closed) is attached to tie switch TSW.

In mixed type distribution network system 4 shown in FIG. 20, it is assumed that a fault is generated in a section between CSWs SW7 and SW8.

When a distribution line fault is generated in mixed type distribution network system 4 wherein VSWs and CSWs are provided in mix as shown in FIG. 20, distribution network monitoring and control system 1 selects a fault processing system automatically by fault processing system automatic selecting means 23 from pre-set conditions such as a type of the applicable distribution network-system (an information of operating system such as underground system, aerial system, etc.), an equipment information, and system status, etc.

Figure 21:
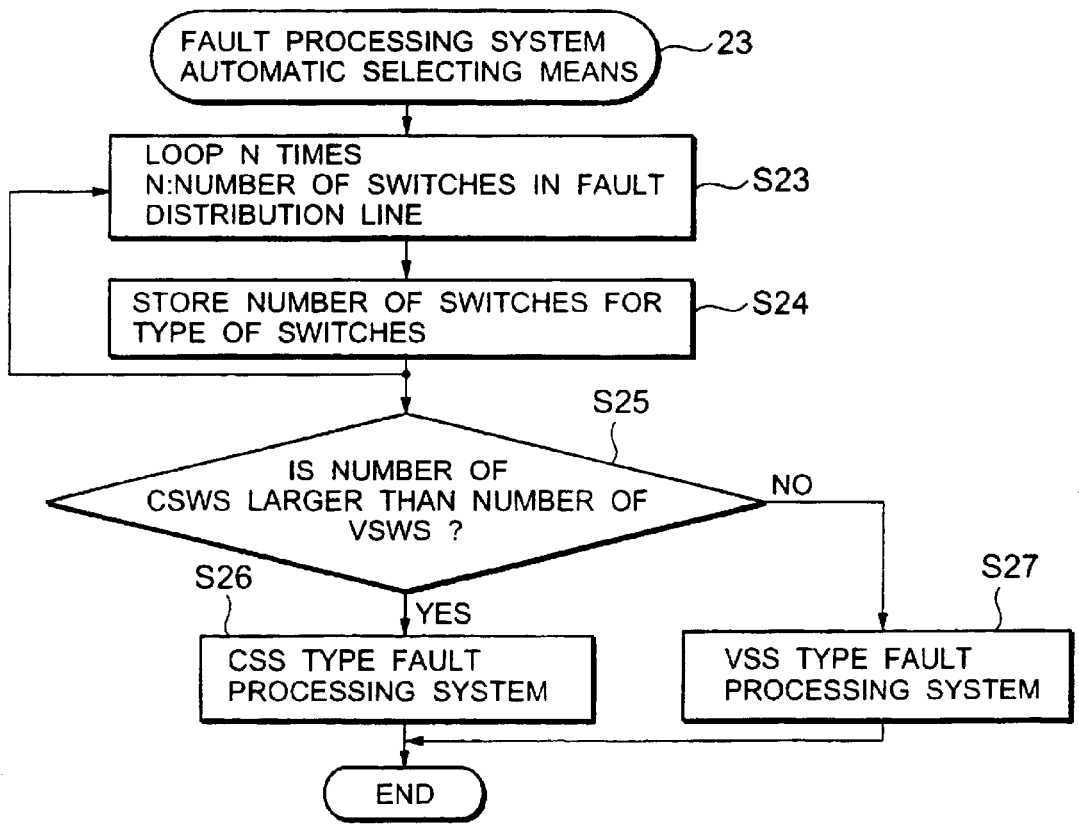
FIG. 21 is a flowchart showing one example of the process executed in the distribution network monitoring and control system according to the seventh embodiment of this invention.

FIG. 21 is a flowchart showing one example of the process executed in fault processing system automatic selecting means 23. Fault processing system automatic selecting means 23 searches the number of switches included in each distribution network system and a type of the switches (CSW or normally excitation switch) for each distribution network system (steps S23 and S24), and selects a fault processing system of the type of switches the number of which is larger (a step S25). In FIG. 20, there are three VSWs and seven CSWs in a range to which power was transmitted by mixed type distribution network system 4 before the fault, and therefore, fault processing system automatic selecting means 23 selects the CSS type fault processing system (a step S26). In the reverse case, the VSS type fault processing system is selected (a step S27).

According to this embodiment as described above, a fault processing system can be automatically decided in a mixed type distribution network system wherein VSWs and CSWs are used in mix, and thus, a fault section can be judged adequately and accurately.

Eighth Embodiment

Figure 16:
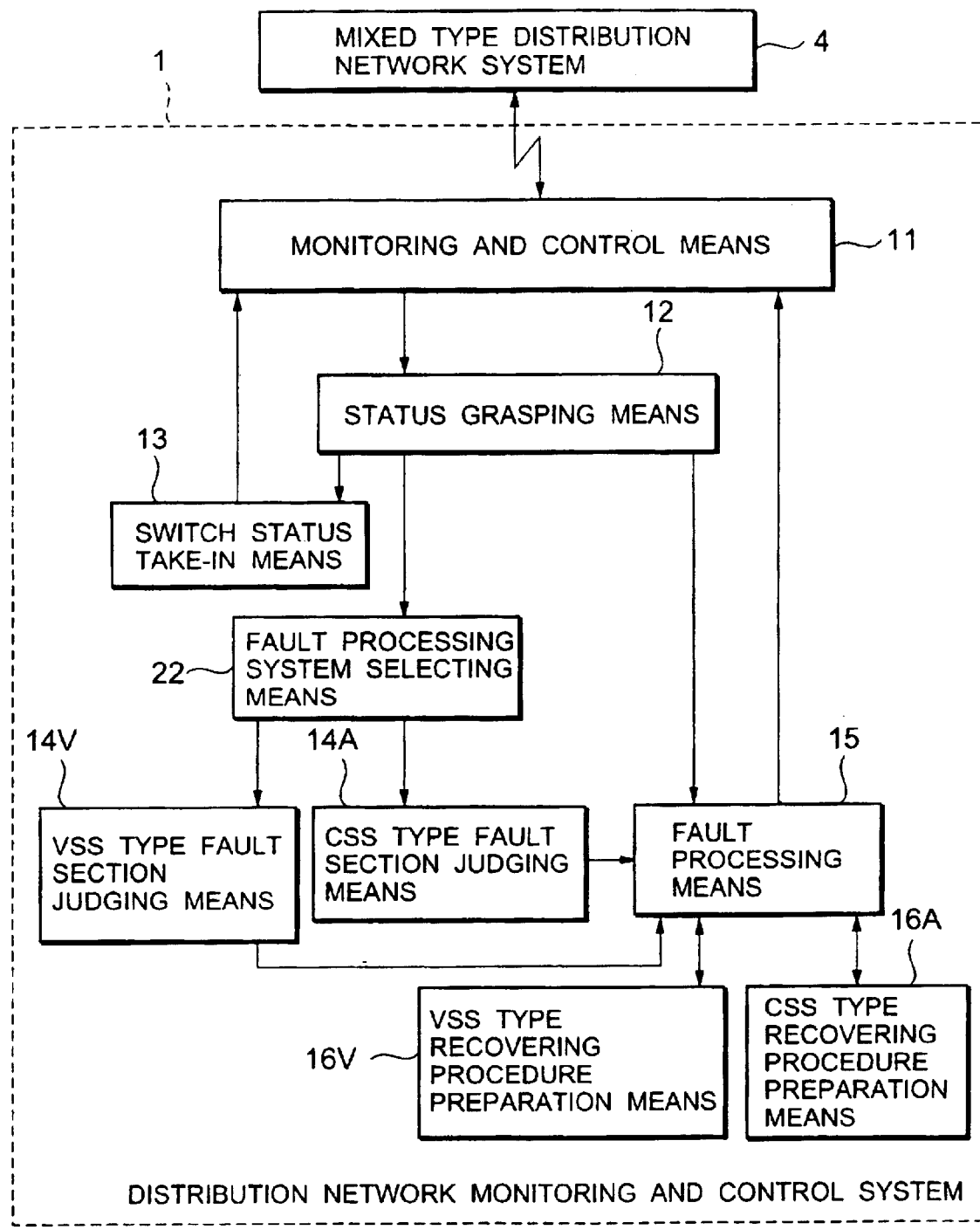
FIG. 16 is a block diagram showing the construction of a distribution network monitoring and control system according to a sixth embodiment of this invention.

Next, an eighth embodiment of this invention will be explained referring to FIG. 22. In the embodiment shown in FIG. 22, distribution network monitoring and control system 1 which monitors and controls mixed type distribution network system 4 is composed as follows:

a recovering procedure preparation system judging means 24 is added to distribution network monitoring and control system 1 according to the sixth embodiment shown in FIG. 16. Here, recovering procedure preparation system judging means 24 is to select a recovering procedure preparation system according to the type (CSW or normally excitation switch) of the switch adjacent to the fault section for each of recovering block of a load side non-faulted outage section.

Further, fault processing system automatic selecting means 23 shown in the seventh embodiment is also usable for fault processing system selecting means 22.

Recovering procedure preparation system judging means 24 selects a recovering procedure preparation system according to the type (CSW or normally excitation switch) of the switch adjacent to the fault section for each of recovering block in response to a recovering procedure preparation request to a non-faulted outage section from fault processing means 15, and notifies the prepared recovering procedure to fault processing means 15.

Figure 23:
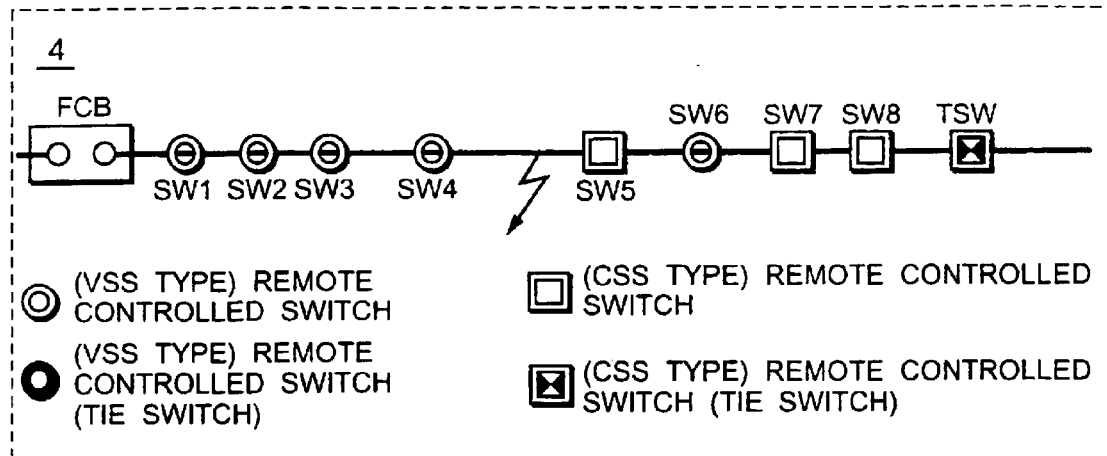
FIG. 23 is an explanatory diagram for explaining an action of the distribution network monitoring and control system according to the eighth embodiment of this invention.

FIG. 23 is a diagram for explaining the fault section judging process executed in the distribution network monitoring and control system 1 in the eighth embodiment.

FIG. 23 shows the construction of a part of mixed type distribution network system 4. In FIG. 23, a feeder circuit breaker FCB, switches SW1–SW8, and a tie switch TSW are provided in mixed type distribution network system 4. Furthermore, for each switch, the type of the switch is shown with different symbol.

In mixed type distribution network system 4 shown in FIG. 23, it is assumed that a fault is generated in a section between normally excitation switch SW4 and CSW SW5.

In FIG. 23, when a distribution line fault is generated, distribution network monitoring and control system 1 selects a fault processing system by fault processing system selecting means 22, and judges a fault section. Here, in the case that the VSS type fault processing system is selected, distribution network monitoring and control system 1 judges a section between switches SW4–SW5 as a fault section by VSS type fault section judging means 14V. However, when a VSS type fault section judging system is used and a recovering procedure preparation system is selected as of VSS type, a proper recovering procedure may not be prepared. For example, when CSWs are treated as manually making switches by VSS type recovering procedure preparation means 16V, in editing the recovering operation procedure to a section between switches SW5–SW6, the breaking operation of switch SW5 that is a CSW cannot be edited prior to the closing operation of switch SW6.

Here, recovering procedure preparation system judging means 24 judges the recovering procedure preparation system based on the type of a switch adjacent to a fault section in a recovering block irrespective of a fault section judging system. The recovering block is a unit to which power is recovered from other distribution line, and, for example, in FIG. 23, the recovering block is a section between switch SW5 and tie switch TSW.

Figure 24:
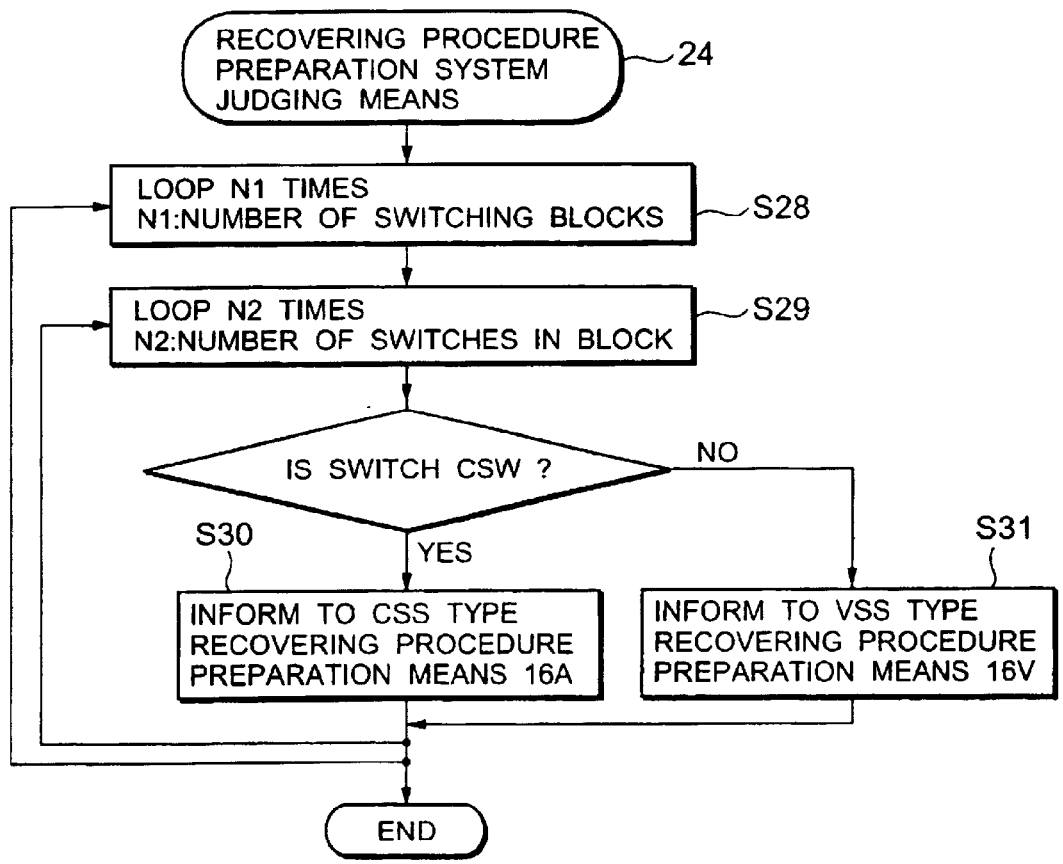
FIG. 24 is a flowchart showing one example of the process executed in the distribution network monitoring and control system according to the eighth embodiment of this invention.

FIG. 24 is a flowchart showing one example of the process executed in recovering procedure preparation system judging means 24.

After deciding a recovering mode, recovering procedure preparation system judging means 24 executes the loop shown in a step S28 by N1 times (N1 is a number of recovering blocks), and searches a switch adjacent to a fault section (a step S29). Then recovering procedure preparation system judging means 24 requests CSS type recovering procedure preparation means 16A to prepare recovering procedure when the switch adjacent to the fault section is a CSW (a step S30), and requests VSS type recovering procedure preparing means 16V to prepare recovering procedure when the switch adjacent to the fault section is a VSW (a step S31).

In FIG. 23, distribution network monitoring and control system 1 judges a section between switch SW5-tie switch TSW as a load side non-faulted outage section. When preparing the recovering procedure, distribution network monitoring and control system 1 judges that the type of switch SW5 adjacent to the fault section is of CSS type by recovering procedure preparation system judging means 24, and requests CSS type recovering procedure preparation means 16A to prepare the recovering procedure.

Thereafter, distribution network monitoring and control system 1 executes the breaking operation of switch SW5 and the closing operation of tie switch TSW in the fault section by fault processing means 15 according to the prepared procedure.

According to this embodiment described above, a recovering procedure can be prepared automatically even in a mixed type distribution network system, and thus, a fault section can be judged adequately and accurately and an outage time can be made short.

Ninth Embodiment

Figure 22:
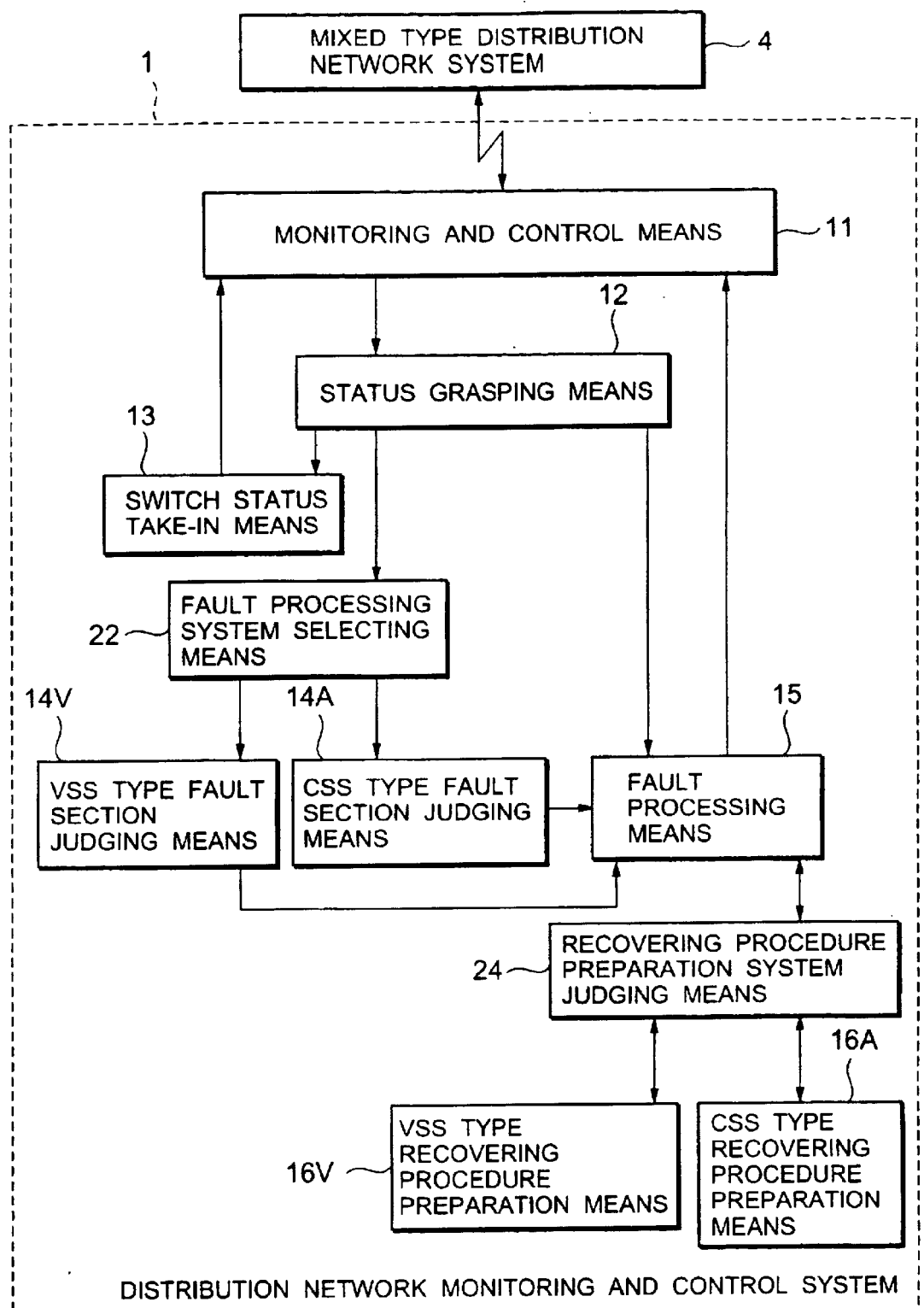
FIG. 22 is a block diagram showing the construction of a distribution network monitoring and control system according to an eighth first embodiment of this invention.
Figure 25:
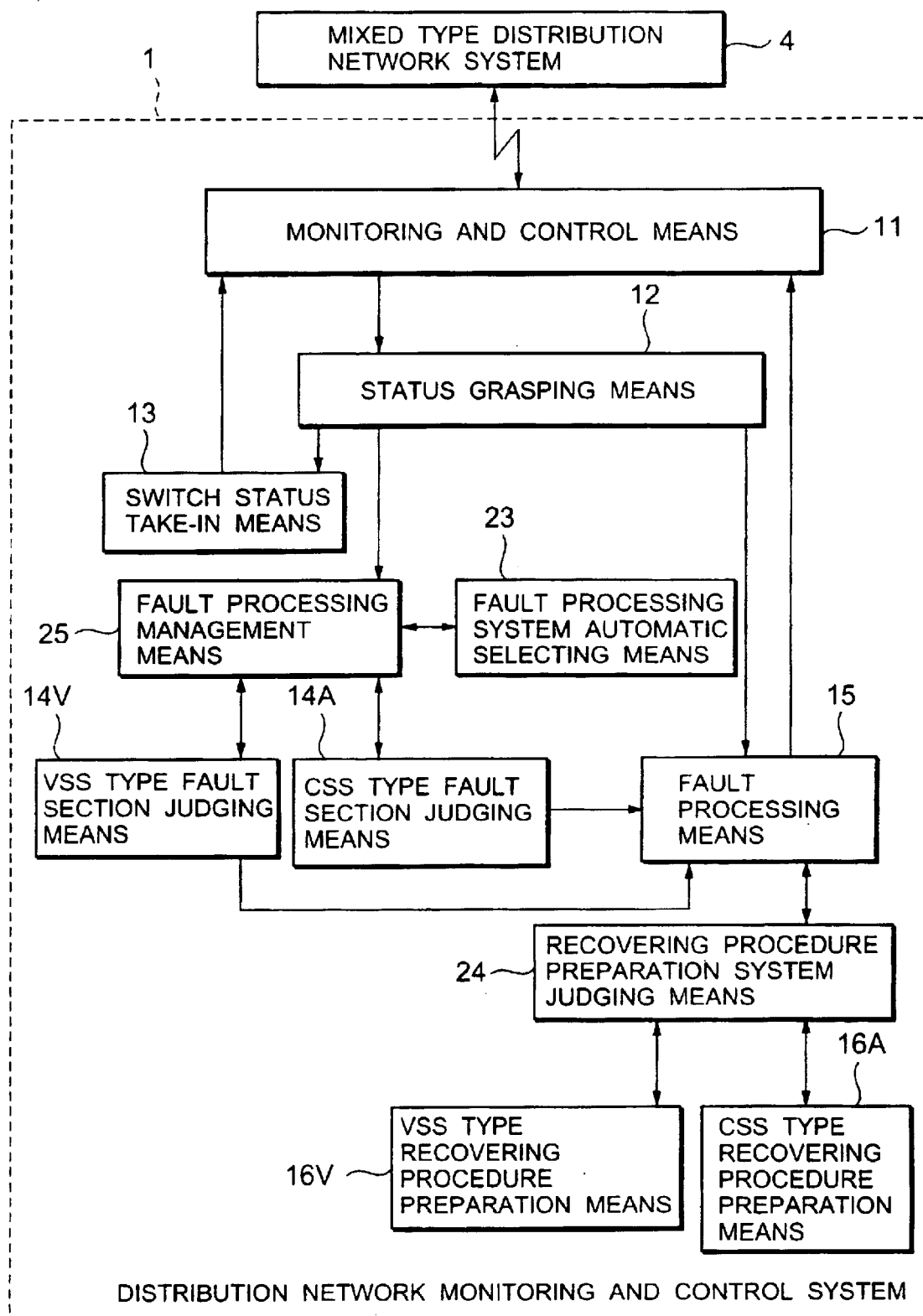
FIG. 25 is a block diagram showing the construction of a distribution network monitoring and control system according to a ninth embodiment of this invention.

Next, a ninth embodiment of this invention will be explained referring to FIG. 25. In the embodiment shown in FIG. 25, distribution network monitoring and control system 1 which monitors and controls mixed type distribution network system 4 is composed as follows:

a fault processing management means 25 is added to distribution network monitoring and control system 1 according to the eighth embodiment shown in FIG. 22. Here, when the fault section cannot be judged by a fault processing system selected by fault processing system automatic selecting means 23, fault processing management means 25 judges a fault section according to the other fault processing system.

Further, fault processing system selecting means 22 shown in the seventh embodiment is also usable for fault processing system automatic selecting means 23.

When a fault section judging request is received from status grasping means 12, fault processing management means 25 selects a fault processing system by fault processing system automatic selecting means 23, and requests the fault section judgment to VSS type fault section judging means 14V in the case that the VSS type fault processing system is selected and requests the fault section judgment to CSS type fault section judging means 14A in the case that the CSS type fault processing system is selected. When notified by fault section judging means of the selected fault processing system that the fault section cannot be judged, fault processing management means 25 requests the fault section judgment to the fault section judging means of the other fault processing system not selected by fault processing system automatic selecting means 23.

Figure 26:
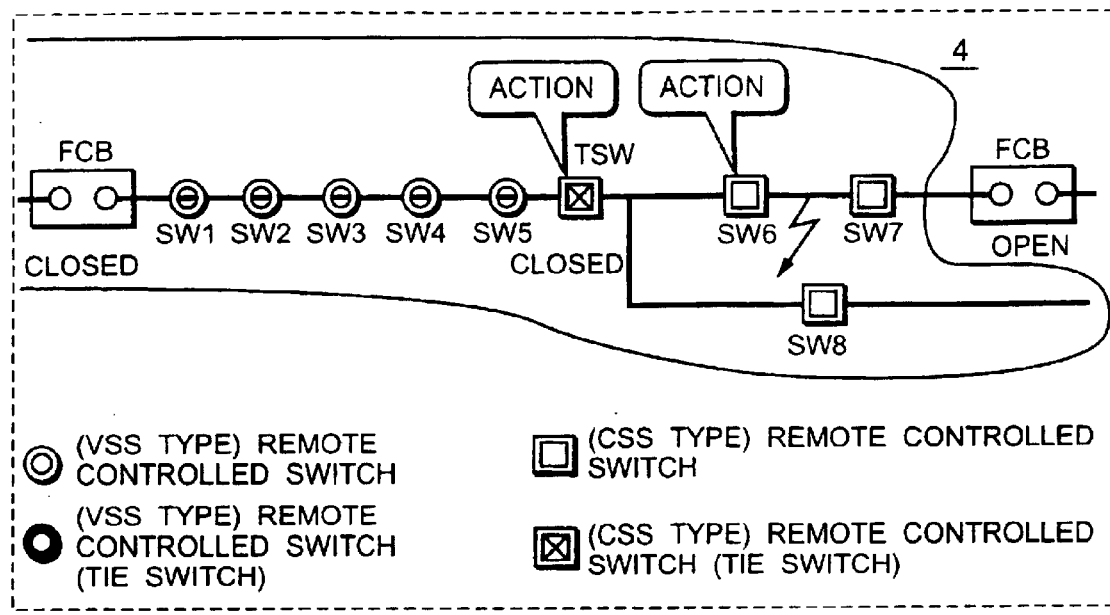
FIG. 26 is an explanatory diagram for explaining an action of the distribution network monitoring and control system according to the ninth embodiment of this invention.

FIG. 26 is a diagram for explaining the fault section judging process executed in the distribution network monitoring and control system 1 in the ninth embodiment.

FIG. 26 shows the construction of a part of mixed type distribution network system 4. In FIG. 26, feeder circuit breakers FCB, switches SW1–SW8, and a tie switch TSW are provided in mixed type distribution network system 4. Furthermore, for each switch, the type of the switch is shown with different symbol.

In mixed type distribution network system 4 shown in FIG. 26, it is assumed that a fault is generated in a section between CSWs SW6 and SW7.

In mixed type distribution network system 4 provided with VSWs and CSWs in mix as shown in FIG. 26, when a fault section cannot be detected in a fault processing system set by fault processing management means 25, distribution network monitoring and control system 1 automatically switches the fault processing system to the other fault processing system by fault processing management means 25 and detects a fault section.

Figure 27:
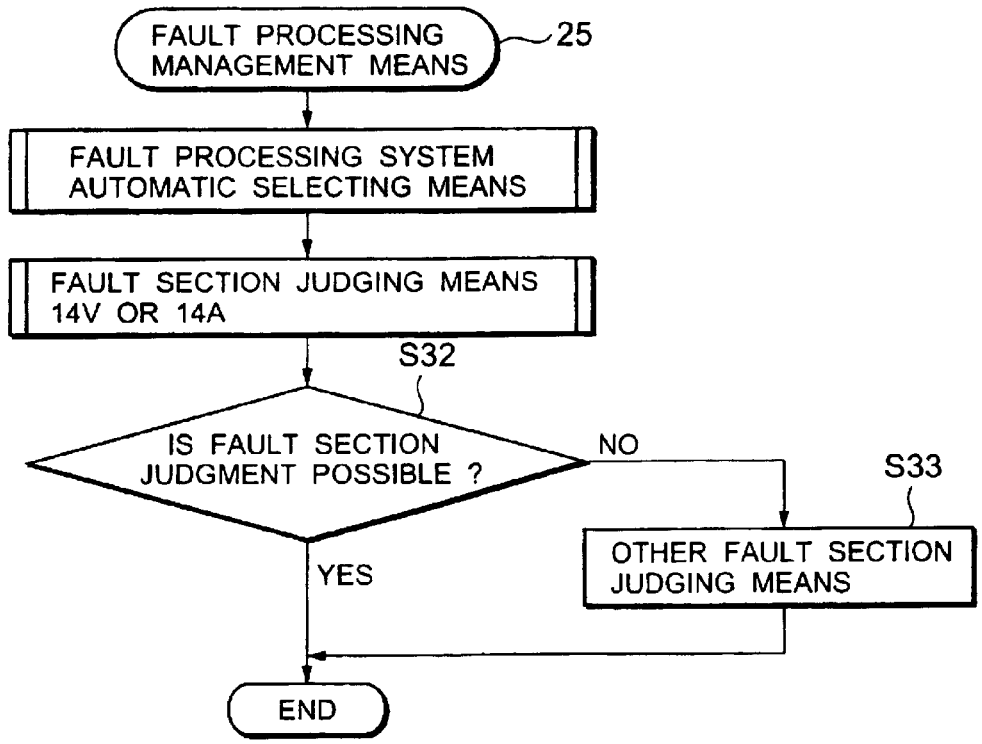
FIG. 27 is a flowchart showing one example of the process executed in the distribution network monitoring and control system according to the ninth embodiment of this invention.

FIG. 27 is a flowchart showing one example of the process executed in fault processing management means 25. Distribution network monitoring and control system 1 executes the fault section judgment according to the fault processing system selected by fault processing system automatic selecting means 23 (a step S32). Here, when a fault section cannot be detected, the fault processing system is switched to the other fault processing system (a step S33). In FIG. 26, distribution network monitoring and control system 1 selects the VSS type fault processing system by fault processing system automatic selecting means 23. However, when a fault generated in the section between switches SW6–SW7 is judged to be an intermittent fault, it becomes impossible to detect the fault section by the VSS type fault processing system. Therefore, when the setting of fault processing system is switched to the CSS type fault processing system, the detection of a fault section becomes possible.

According to this embodiment as described above, when a fault section cannot be judged by the selected fault processing system, fault processing management means 25 switches the setting of fault processing system to the other fault processing system for judging a fault section. Thus, a fault section can be adequately and accurately judged.

Tenth Embodiment

Next, a tenth embodiment of this invention will be explained referring to FIG. 28. In the embodiment shown in FIG. 28, distribution network monitoring and control system 1 which monitors and controls mixed type distribution network system 4 is composed as follows:

a mixed type distribution network system fault section comparing and judging means 26 is added, instead of fault processing system selecting means 22, to distribution network monitoring and control system 1 according to the eighth embodiment shown in FIG. 22.

Mixed type distribution network system fault section comparing and judging means 26 is to judge a proper fault section by comparing the results executed simultaneously by a plurality of fault section judging means.

CSS type fault section judging means 14A and VSS type fault section judging means 14V execute the fault section judgment according to a fault section judging request from status grasping means 12, respectively. Thereafter, mixed type distribution network system fault section comparing and judging means 26 judges a proper fault section based on the fault section judging results from CSS type fault section judging means 14A and VSS type fault section judging means 14V, and notifies the judged fault section to fault processing means 15.

Figure 29:
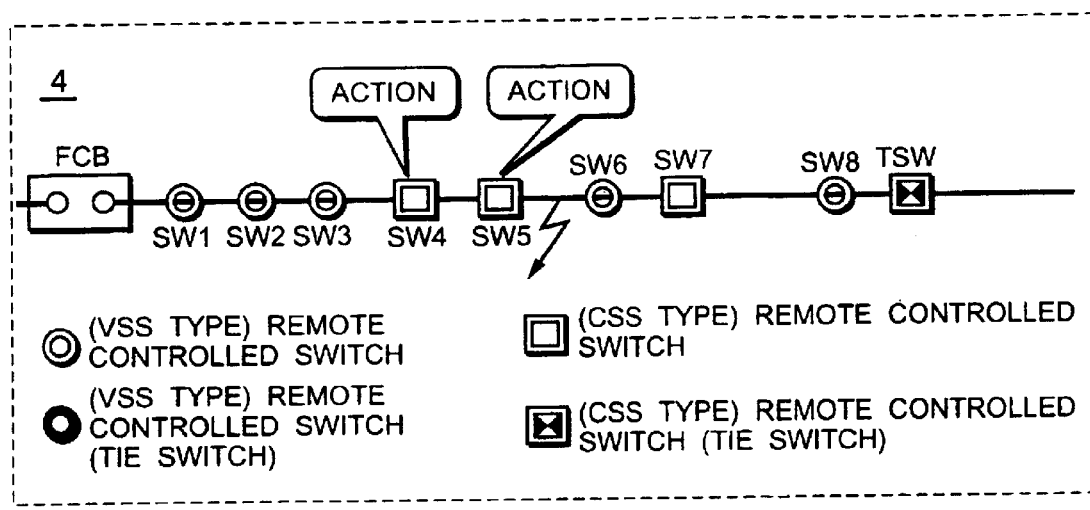
FIG. 29 is an explanatory diagram for explaining an action of the distribution network monitoring and control system according to the tenth embodiment of this invention.

FIG. 29 is a diagram for explaining the fault section judging process executed in distribution network monitoring and control system 1 according to the tenth embodiment.

FIG. 29 shows the construction of a part of mixed type distribution network system 4. In FIG. 29, a feeder circuit breaker FCB, switches SW1–SW8, and a tie switch TSW are provided in mixed type distribution network system 4. Furthermore, for each switch, the type of the switch is shown with different symbol.

In mixed type distribution network system 4 shown in FIG. 29, it is assumed that a fault is generated in a section between CSW SW5 and normally excitation switch SW6.

In FIG. 29, distribution network monitoring and control system 1 detects an initial trip of feeder circuit breaker FCB by status grasping means 12, and after a determined time passed from the initial trip of feeder circuit breaker FCB, takes in the status of switches by switch status take-in means 13. Then distribution network monitoring and control system 1 makes a request for fault section judgment to CSS type fault section judging means 14A and VSS type fault section judging means 14V by status grasping means 12. CSS type fault section judging means 14A judges a section between switches SW5–SW7 as a fault section and notifies it to mixed type distribution network system fault section comparing and judging means 26. VSS type fault section judging means 14V judges a section between switches SW3–SW6 as a fault section and notifies it to mixed type distribution network system fault section comparing and judging means 26. Mixed type distribution network system fault section comparing and judging means 26 judges, based on the notified fault sections, a consolidated fault section according to a pre-determined rule, and notifies the consolidated fault section to fault processing means 15.

Figure 30:
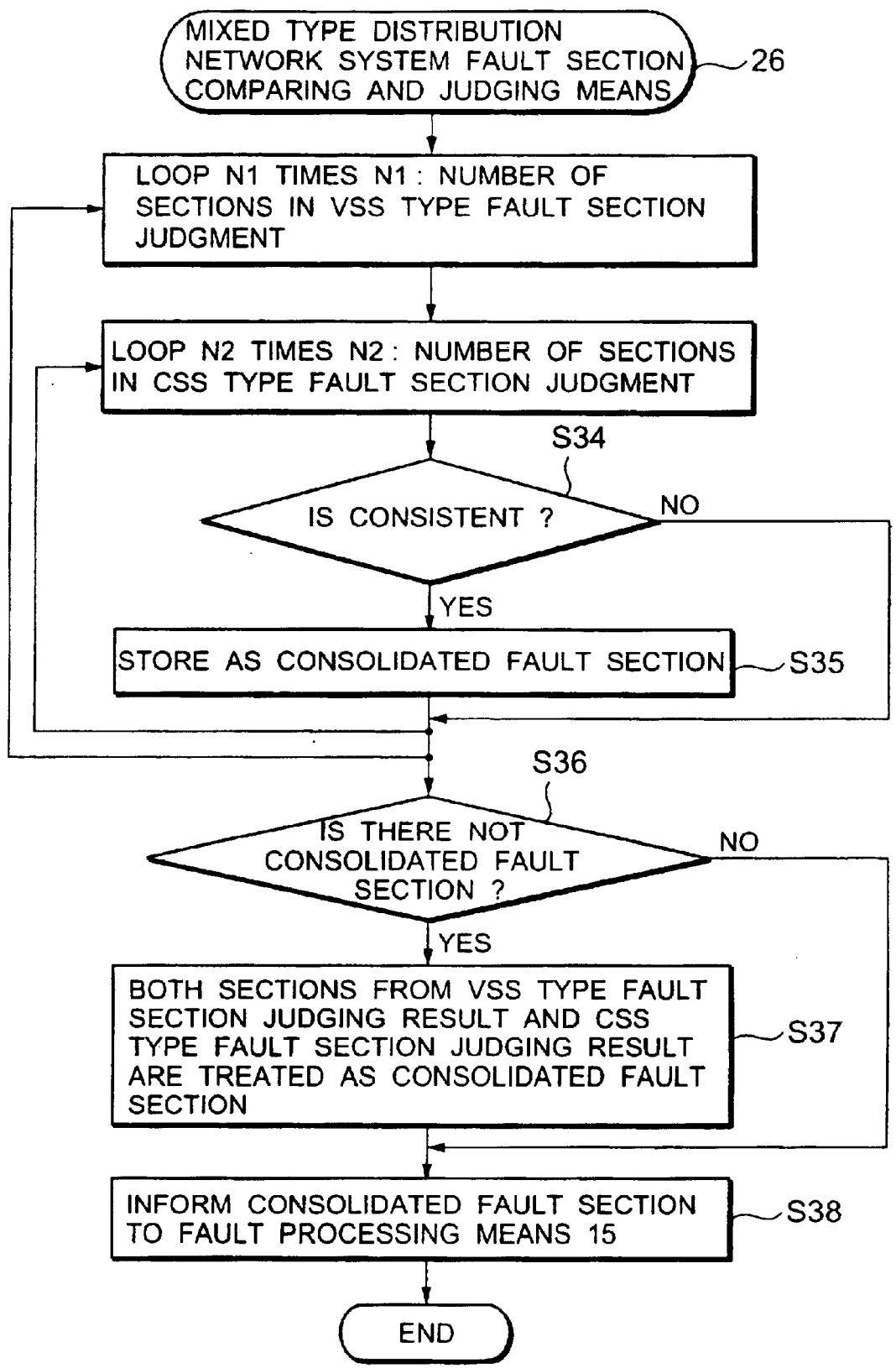
FIG. 30 is a flowchart showing one example of the process executed in the distribution network monitoring and control system according to the tenth embodiment of this invention.

FIG. 30 is a flowchart showing one example of the process executed in mixed type distribution network system fault section comparing and judging means 26. Mixed type distribution network system fault section comparing and judging 26 finds a duplicated section from a fault section of the judging result of CSS type fault section judging means 14A and a fault section of the judging result of VSS type fault section judging means 14V (a step S34), and stores the duplicated section as a consolidated fault section (a step S35). If there is no consolidated fault section (a step S36), all the sections composed of the fault section by the judging result of CSS type fault section judging means 14A and the fault section by the judging result of VSS type fault section judging means 14V are made a consolidated fault section (a step S37). Thereafter, mixed type distribution network system fault section comparing and judging means 26 notifies fault process means 15 of the consolidated fault section (a step S38).

In FIG. 29, mixed type distribution network system fault section comparing and judging means 26 judges a section between switches SW5–SW6 that is duplicated between a section between switches SW5–SW7 that is a fault section judging result by CSS type fault section judging means 14A and a section between switches SW5–SW6 that is a fault section judging result by VSS type fault section judging means 14V as a consolidated fault section, and notifies it to fault processing means 15. Thereafter, distribution network monitoring and control system 1 breaks switch SW5 that is a power source side switch of the fault section, recovers the power source side non-faulted outage section by closing feeder circuit breaker FCB by fault processing means 15, and executes the recovering procedure to the load side non-faulted outage section made by VSS type recovering procedure preparation means 16V.

According to this embodiment as described above, adequate and accurate fault section judgment can be made in a mixed type distribution network system.

Eleventh Embodiment

Figure 28:
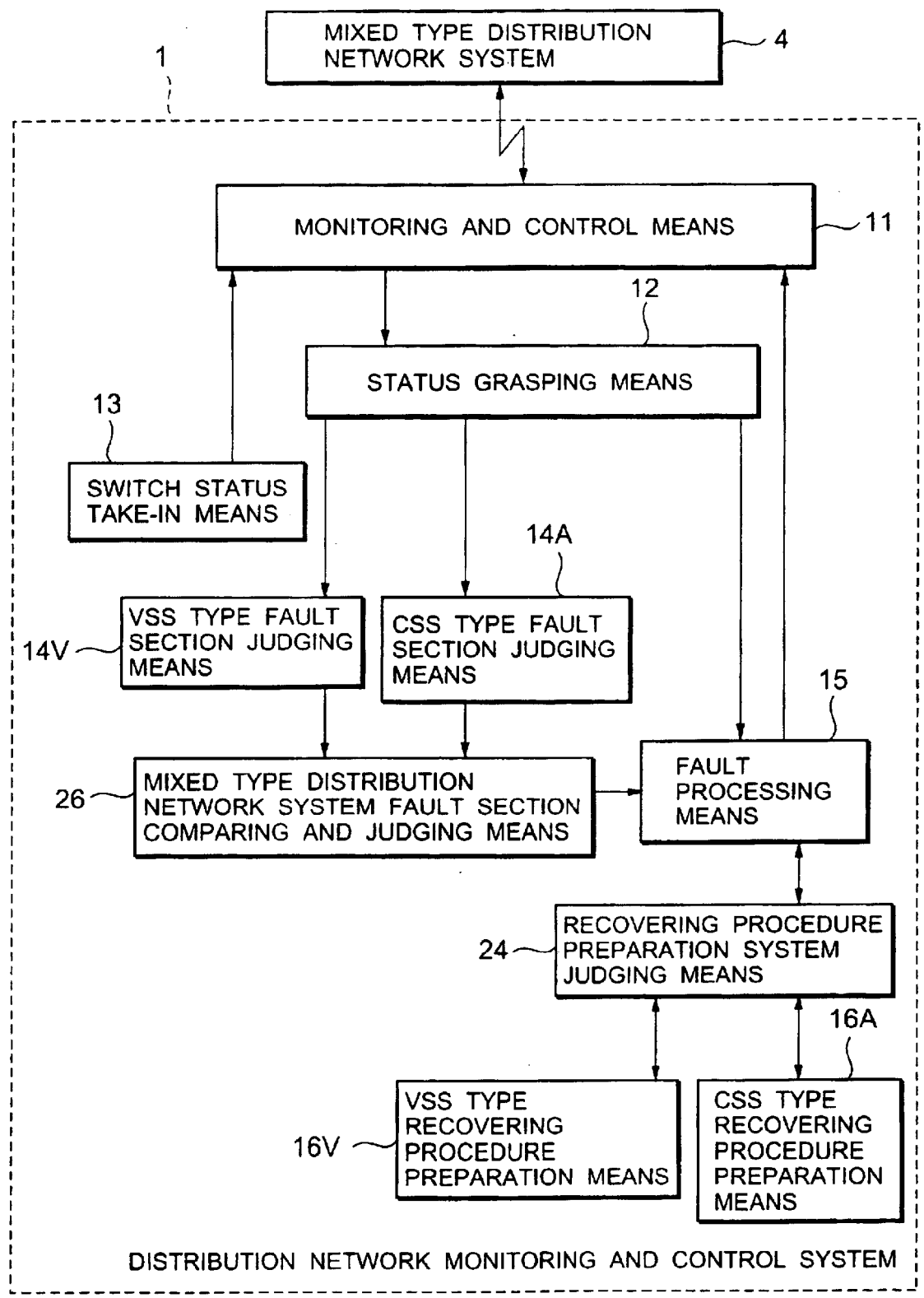
FIG. 28 is a block diagram showing the construction of a distribution network monitoring and control system according to a tenth embodiment of this invention.
Figure 31:
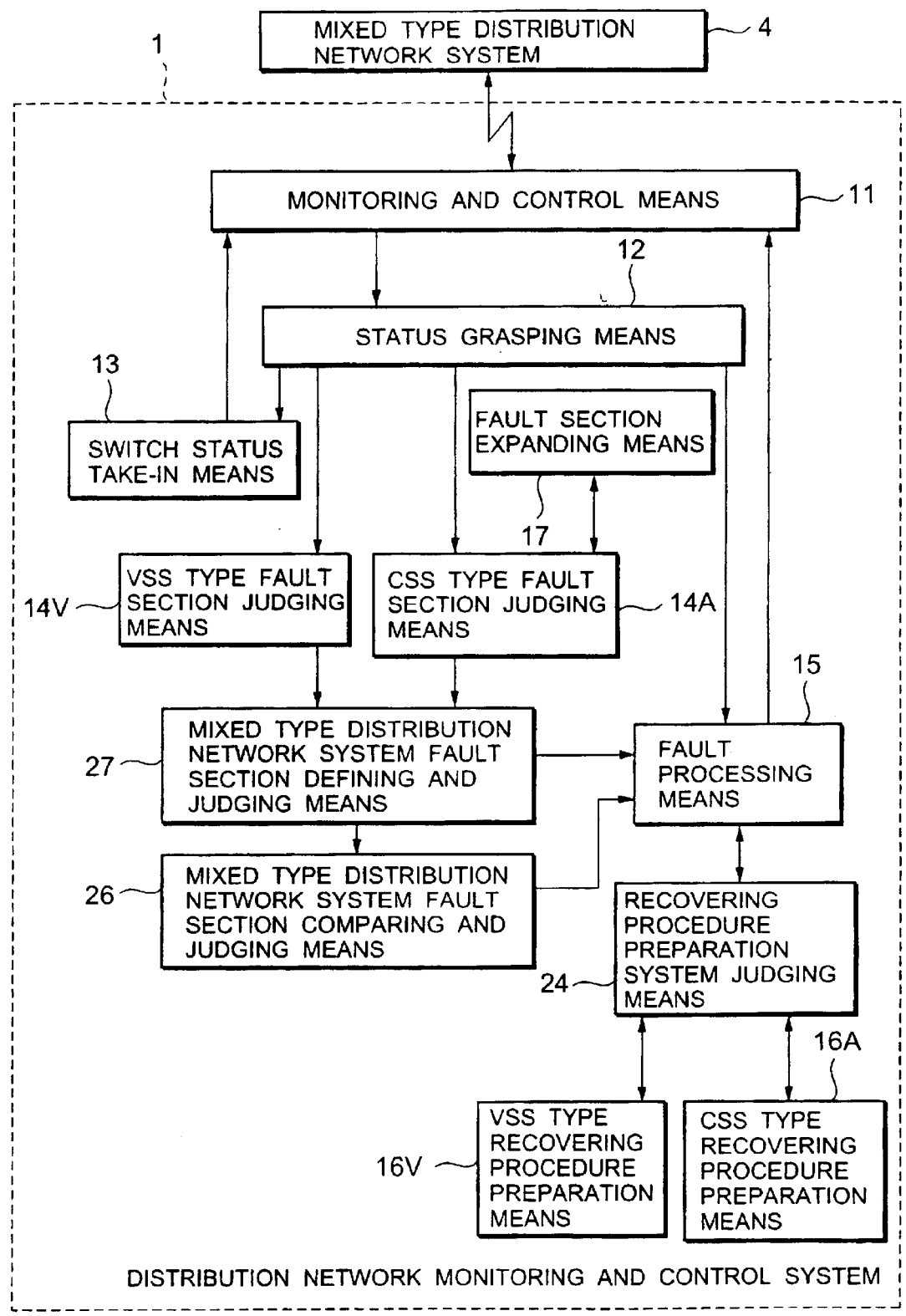
FIG. 31 is a block diagram showing the construction of a distribution network monitoring and control system according to an eleventh embodiment of this invention.

Next, an eleventh embodiment of this invention will be explained referring to FIG. 31. In the embodiment shown in FIG. 31, distribution network monitoring and control system 1 which monitors and controls mixed type distribution network system 4 is composed as follows:

a mixed type distribution network system fault section defining and judging means 27 is added to distribution network monitoring and control system 1 according to the tenth embodiment shown in FIG. 28. Here, mixed type distribution network system fault section defining and judging means 27 is to judge whether or not a fault section is defined according to the fault section judging result by a fault processing system which completed the fault section judgment earlier, and to interrupt the other fault processing system when a fault section is defined.

CSS type fault section judging means 14A and VSS type fault section judging means 14V execute the fault section judgments in response to a fault section judging request from status grasping means 12, respectively. Thereafter, mixed type distribution network system fault section defining and judging means 27 receives fault section judging results from CSS type fault section judging means 14A and VSS type fault section judging means 14V, and judges whether or not a fault section is to be defined based on the notified fault section judging results. When the fault section is defined, mixed type distribution network system fault section defining and judging means 27 notifies the defined fault section to fault processing means 15, and when judged that the fault section is not defined, mixed type distribution network system fault section defining and judging means 27 so notifies mixed type distribution network system fault section comparing and judging means 26.

Figure 32:
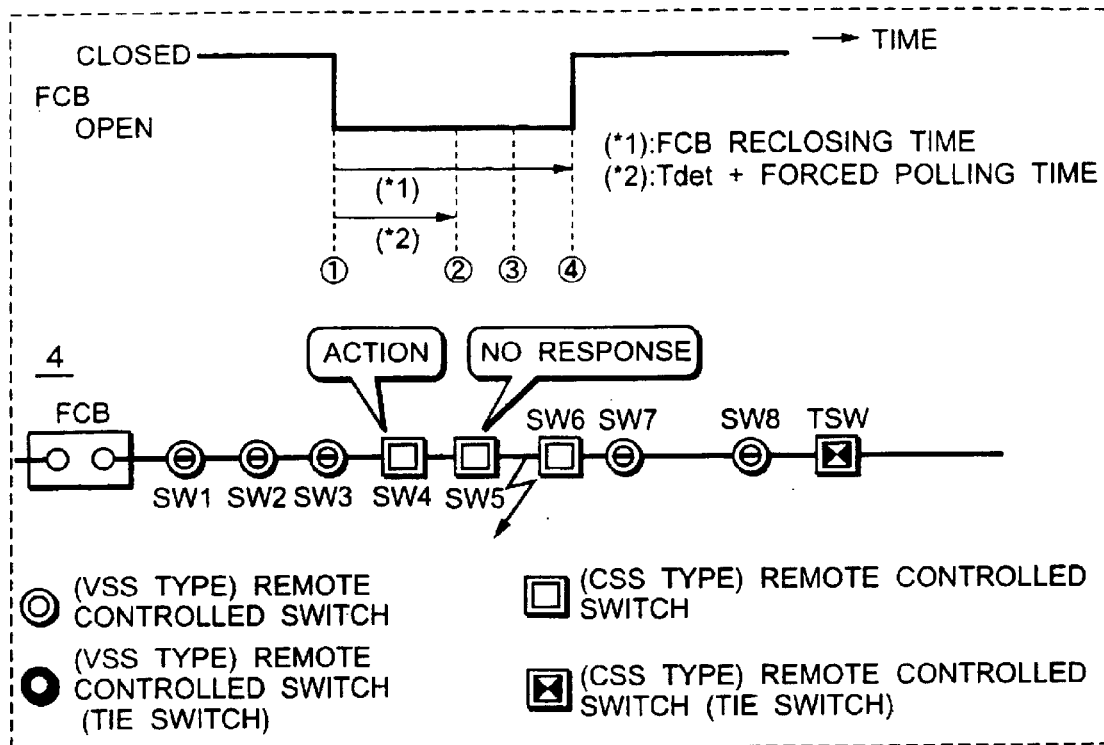
FIG. 32 is an explanatory diagram for explaining an action of the distribution network monitoring and control system according to the eleventh embodiment of this invention.

FIG. 32 is a diagram for explaining the fault section judging process executed in distribution network monitoring and control system 1 in the eleventh embodiment of this invention.

In FIG. 32, FIG. 32(*a*) shows a timing chart of the fault section judging process and FIG. 32(*b*) shows the construction of a part of mixed type distribution network system 4. In FIG. 32(*b*), a feeder circuit breaker FCB, switches SW1–SW8 and a tie switch TSW are provided in mixed type distribution network system 4. Furthermore, for each switch, the type of the switch is shown with different symbol. Here, it is assumed that a fault is generated in a section between CSWs SW5 and SW6.

In FIG. 32, distribution network monitoring and control system 1 detects an initial trip of feeder circuit breaker FCB by status grasping means 12, and after time Tdet elapsed from the initial trip of feeder circuit breaker FCB, takes in the switch status by switch status take-in means 13 and makes a request for fault section judgment to CSS type fault section judging means 14A and VSS type fault section judging means 14V by status grasping means 12. In the fault section judging system according to VSS type fault processing system, it is necessary to reclose feeder circuit breaker FCB, and therefore, in most cases, the fault section judgment according to CSS type fault processing system is faster. When a fault section was judged by CSS type fault section judging means 14A according to CSS type fault processing system faster than by VSS type fault section judging means 14V according to the VSS type fault processing system, CSS type fault section judging means 14A judges a section between switches SW4–SW6 as a fault section and notifies it to mixed type distribution network system fault section defining and judging means 27.

Figure 33:
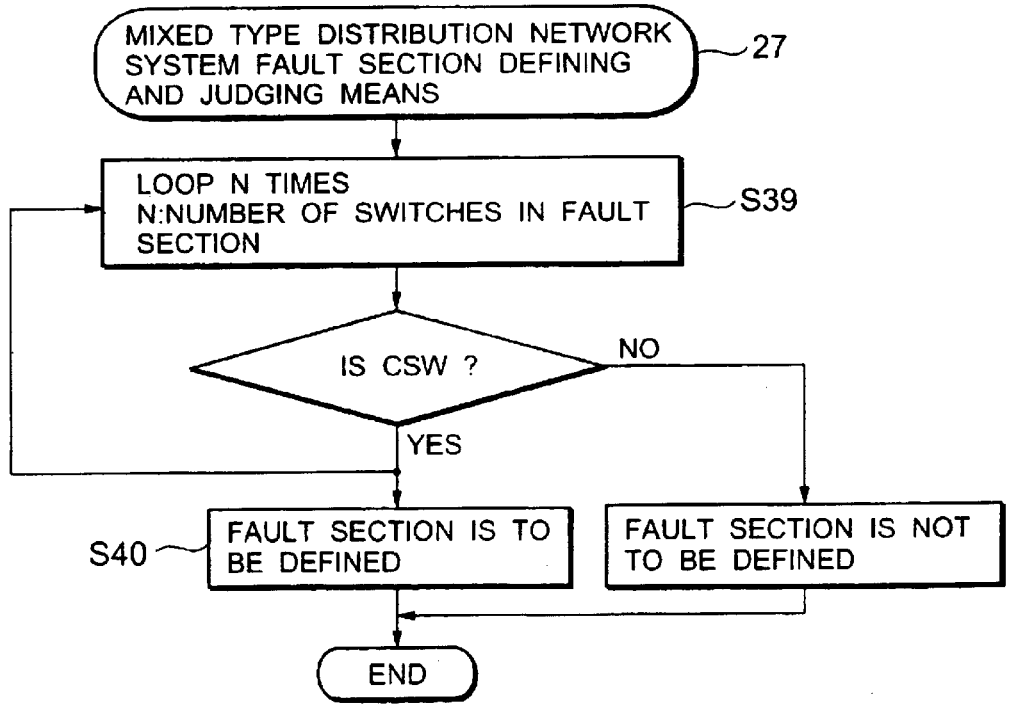
FIG. 33 is a flowchart showing one example of the process executed in the distribution network monitoring and control system according to the eleventh embodiment of this invention.

FIG. 33 is a flowchart showing one example of the process executed in mixed type distribution network system fault section defining and judging means 27. Mixed type distribution network system fault section defining and judging means 27 executes the loop shown in a step S39 N times (N is the number of switches in the fault section) based on a fault section judged by CSS type fault section judging means 14A (step S39), and checks that all switches are CSWs. This is because a fault section can be limited down by mixed type distribution network system fault section comparing and judging means 26 when VSWs are provided in a fault section. When it is found that the switches are all CSWs by the above-mentioned check, it is judged that a fault section is defined (a step S40).

In FIG. 32, mixed type distribution network system fault section defining and judging means 27 judges that a fault section is defined because switches in the fault section between switches SW4–SW6 are all CSWs and no VSW is contained in the fault section, and mixed type distribution network system fault section defining and judging means 27 so notifies to fault processing means 15.

Fault processing means 15 breaks switch SW4 that is a power source side switch in the fault section so that no power is transmitted to the fault section by reclosing feeder circuit breaker FCB.

According to this embodiment, the adequate and accurate judgment of a fault section can also be made in a mixed type distribution network system.

In the above-described embodiments, means in distribution network monitoring and control systems 1A and 1 are embodied by executing the flowchart shown for the means by a computer. But it is possible to embody the means in distribution network monitoring and control systems 1A and 1 by hardware to execute the function of the flowchart shown for the means.

Obviously, numerous modifications and variations of the present invention are possible in light of the above teachings. It is therefore to be understood that within the scope of the appended claims, the invention may be practiced otherwise than as specifically described herein.

What is claimed is:

1. A distribution network monitoring and control system for monitoring and controlling a CSS type distribution network system provided with CSWs, comprising:

monitoring and control means for taking in an information of said CSWs of said CSS type distribution network system and for outputting a control information for said CSWs thereof;

status grasping means for judging charging and outage state of said CSS type distribution network system according to said information on said CSWs taken by said monitoring and control means;

switch status take-in means for taking in status of said CSWs in a range to which power was so far transmitted through a feeder causing a fault, when said status grasping means judged that said fault was generated;

CSS type fault section judging means for judging a fault section according to a fault information of said CSWs taken in by said switch status take-in means;

fault section expanding means for receiving an information of said fault section from said CSS type fault section judging means, for expanding a fault section to a load side, when status of said CSWs at said load side of said fault section cannot be taken in, and for notifying an expanded fault section to said CSS type fault section judging means;

said CSS type fault section judging means deciding said expanded fault section notified from said fault section expanding means as said fault section;

fault processing means for isolating said fault section decided by said CSS type fault section judging means from said CSS type distribution network system and for executing recovering operation to an outage section other than said fault section; and CSS type recovering procedure preparation means for preparing a recovering operation procedure to said outage section other than said fault section on an assumption that said CSWs are to be controlled.

2. The distribution network monitoring and control system according to claim 1, further comprising:

self-line loop judging means for judging whether or not a self-line loop is present in said CSS type distribution network system and for treating said CSWs in said self-line loop route as non-remote controlled CSWs when there is said self-line loop;

wherein said fault section expanding means expands said fault section based on a judging result of said self-line loop judging means.

3. The distribution network monitoring and control system according to claim 1, further comprising:

other line loop judging means for judging whether or not a fault is generated in other line loop in said CSS type distribution network system before fault by receiving a trip notification of a feeder circuit breaker and system information before fault from said status grasping means;

wherein said CSS type fault section judging means judges that all sections are fault sections when said other line loop judging means judges that said fault is generated in said other line loop.

4. The distribution network monitoring and control system according to claim 1, further comprising:

fault factor judging means for judging fault factor for every fault information from said status grasping means;

wherein said CSS type fault section judging means judges said fault section for said fault factor judged by said fault factor judging means.

5. The distribution network monitoring and control system according to claim 1, further comprising:

intermittent fault judging means for judging whether or not said fault is an intermittent fault based on said fault information from said status grasping means within a certain time period;

wherein said CSS type fault section judging means judges that all sections are fault sections when said intermittent fault judging means judges that said fault is said intermittent fault within said certain time period.

6. A distribution network monitoring and control system for monitoring and controlling a mixed type distribution network system provided with VSWs and CSWs in mix, comprising:

monitoring and control means for taking in an information of said VSWs and said CSWs of said mixed type distribution network system and for outputting a control information for said VSWs and'said CSWs thereof;

status grasping means for judging charging and outage state of said mixed type distribution network system according to said information on said VSWs and said CSWs taken by said monitoring and control means;

switch status take-in means for taking in status of said VSWs and said CSWs in a range to which power was so far transmitted through a feeder causing a fault, when said status grasping means judged that said fault was generated;

fault processing system selecting means for selecting either a VSS type fault processing system or a CSS type fault processing system when a fault section judging request is received from said status grasping means;

VSS type fault section judging means for judging a fault section according to a fault information of said VSWs taken in by said switch status take-in means when said VSS type fault processing system is selected by said fault processing system selecting means;

CSS type fault section judging means for judging a fault section according to a fault information of said CSWs taken in by said switch status take-in means when said CSS type fault processing system is selected by said fault processing system selecting means;

fault processing means for isolating said fault section decided by a selected one of said VSS type fault section judging means and said CSS type fault section judging means from said mixed type distribution network system and for executing recovering operation to an outage section other than said fault section;

VSS type recovering procedure preparation means for preparing a recovering operation procedure to said outage section other than said fault section on a assumption that said VSWs are to be controlled when said VSS type fault processing system is selected; and CSS type recovering procedure preparation means for preparing a recovering operation procedure to said outage section other than said fault section on an assumption that said CSWs are to be controlled when said CSS type fault processing system is selected.

7. The distribution network monitoring and control system according to claim 6, wherein:

said fault processing system selecting means selects automatically either said VSS type fault processing system or said CSS type fault processing system when said fault section judging request is received from said status grasping means according to pre-set conditions.

8. The distribution network monitoring and control system according to claim 6, further comprising:

recovering procedure preparation system judging means for selecting a recovering procedure preparation system according to a type of one of said VSW and said CSW adjacent to said fault section;

wherein said VSS type recovering procedure preparation means prepares said recovering operation procedure when said VSS type fault processing system is selected by said recovering procedure preparation judging means; and wherein said CSS type recovering procedure preparation means prepares said recovering operation when said CSS type fault processing system is selected by said recovering procedure preparation judging means.

9. The distribution network monitoring and control system according to claim 6 or claim 7, further comprising:

a fault processing management means for selecting one fault processing system by said fault processing system selecting means when said fault section judging request is received from said status grasping means and for selecting the other fault processing system when notified that said fault section can not judged by said fault processing system selected by said fault processing system selecting means;

wherein said VSS type fault section judging means judges said fault section when said VSS type fault processing system is selected; and wherein said CSS type fault section judging means judges said fault section when said CSS type fault processing system is selected.

10. A distribution network monitoring and control system for monitoring and controlling a mixed type distribution network system provided with VSWs and CSWs in mix, comprising:

monitoring and control means for taking in an information of said VSWs and said CSWs of said mixed type distribution network system and for outputting a control information for said VSWs and said CSWs thereof;

status grasping means for judging charging and outage state of said mixed type distribution network system according to said information on said VSWs and said CSWs taken by said monitoring and control means;

switch status take-in means for taking in status of said VSWs and said CSWs in a range to which power was so far transmitted through a feeder causing a fault, when said status grasping means judged that said fault was generated;

VSS type fault section judging means for judging a fault section according to a fault information of said VSWs taken in by said switch status take-in means;

CSS type fault section judging means for judging a fault section according to a fault information of said CSWs taken in by said switch status take-in means;

mixed type distribution network system fault section comparing and judging means for judging a fault section by comparing results executed simultaneously by said VSS type fault section judging means and said CSS type fault section judging means;

fault processing means for isolating said fault section decided by said mixed type distribution network system fault section comparing and judging means from said mixed type distribution network system and for executing recovering operation to an outage section other than said fault section;

VSS type recovering procedure preparation means for preparing a recovering operation procedure to said outage section other than said fault section on a assumption that said VSWs are to be controlled; and CSS type recovering procedure preparation means for preparing a recovering operation procedure to said outage section other than said proper fault section on an assumption that said CSWs are to be controlled.

11. The distribution network monitoring and control system according to claim 10, further comprising:

mixed type distribution network system fault section defining and judging means for judging whether or not a fault section is defined according to a fault section judging result by one of said VSS type fault section judging means and said CSS type fault section judging means which completed said fault section judgment earlier and for interrupting judgment by fault section judging means when said fault section is defined;

wherein said mixed type distribution network system fault section comparing and judging means judges said fault section when said fault section is not defined by said mixed type distribution network system fault section defining and judging means.

* * * * *

UNITED STATES PATENT AND TRADEMARK OFFICE
CERTIFICATE OF CORRECTION

PATENT NO. : 6,963,793 B2
DATED : November 8, 2005
INVENTOR(S) : Yamada et al.

It is certified that error appears in the above-identified patent and that said Letters Patent is hereby corrected as shown below:

Title page,
Item [30], Foreign Application Priority Data should read:
-- Mar. 14, 2003 (JP)......................................2003-069321 --.

Signed and Sealed this

Thirty-first Day of January, 2006

JON W. DUDAS
*Director of the United States Patent and Trademark Office*